(12) United States Patent
Nishioka

(10) Patent No.: US 8,903,000 B2
(45) Date of Patent: Dec. 2, 2014

(54) TRANSMISSION CIRCUIT, RECEPTION CIRCUIT, TRANSMISSION METHOD, RECEPTION METHOD, COMMUNICATION SYSTEM AND COMMUNICATION METHOD THEREFOR

(75) Inventor: Shinichiro Nishioka, Osaka (JP)

(73) Assignee: Panasonic Corporation, Osaka (JP)

( * ) Notice: Subject to any disclaimer, the term of this patent is extended or adjusted under 35 U.S.C. 154(b) by 41 days.

(21) Appl. No.: 13/823,575

(22) PCT Filed: Sep. 30, 2011

(86) PCT No.: PCT/JP2011/005553
§ 371 (c)(1),
(2), (4) Date: Mar. 14, 2013

(87) PCT Pub. No.: WO2012/049815
PCT Pub. Date: Apr. 19, 2012

(65) Prior Publication Data
US 2013/0170579 A1  Jul. 4, 2013

(30) Foreign Application Priority Data

Oct. 12, 2010  (JP) ................. 2010-229356

(51) Int. Cl.
*H04B 1/52*  (2006.01)
(52) U.S. Cl.
USPC ........................................ 375/257
(58) Field of Classification Search
CPC ..... H04L 7/10; H04L 25/026; H04L 25/0272; H04L 25/4908; H04L 25/491; H04L 25/4917; H04L 25/4919; H04L 25/4921; H04L 27/04; H04L 27/06; H04L 27/12; H04L 27/14; H04L 27/20; H04L 27/22; H04L 27/2627; H04L 27/2649

USPC ......... 375/241, 242, 257, 260, 262, 265, 267, 375/295, 300, 316, 340, 341; 329/315–317, 329/345, 347, 348; 332/117, 119, 144, 145, 332/149, 151; 714/756, 759, 789, 792, 794, 714/795

See application file for complete search history.

(56) References Cited

U.S. PATENT DOCUMENTS 4,486,739 A   12/1984 Franaszek et al.
5,548,615 A *  8/1996 Wei .............................. 375/281
(Continued)

FOREIGN PATENT DOCUMENTS

JP     59-10056      1/1984
JP     2010-93658    4/2010
WO    2008/059588    5/2008

OTHER PUBLICATIONS

International Search Report issued Nov. 22, 2011 in International (PCT) Application No. PCT/JP2011/005553.

(Continued)

*Primary Examiner* — Young T. Tse
(74) *Attorney, Agent, or Firm* — Wenderoth, Lind & Ponack, L.L.P.

(57) ABSTRACT

In transmission of channel-coded serial data, early establishment of symbol synchronization between a transmitter and a receiver is achieved while reducing coding loss in transmission of valid data. In an idle period for not transmitting the valid data, a transmitting circuit selects first channel coding (e.g. 8B/10B coding) enabling early establishment of synchronization and transmits a synchronization symbol encoded using the first channel coding. In response to this, a receiving circuit establishes and maintains symbol synchronization. When the valid data is transmitted, the transmitting circuit transmits a symbol indicating a packet start position, selects second channel coding (e.g. 64B/66B coding) having less coding loss than the first channel coding, and transmits the valid data encoded using the second channel coding. Upon reception of the symbol indicating the packet start position, the receiving circuit switches to reception using the second channel coding and receives the valid data.

15 Claims, 17 Drawing Sheets

(56) References Cited

U.S. PATENT DOCUMENTS

| | | | |
|---|---|---|---|
| 6,219,357 B1* | 4/2001 | Ishikawa | 370/535 |
| 6,427,135 B1* | 7/2002 | Miseki et al. | 704/258 |
| 7,477,172 B1* | 1/2009 | Lo et al. | 341/101 |
| 8,126,061 B2* | 2/2012 | Cooper et al. | 375/240.26 |
| 2006/0034332 A1* | 2/2006 | Haga | 370/474 |
| 2009/0276683 A1 | 11/2009 | Toyoda et al. | |
| 2010/0054360 A1* | 3/2010 | Sakai | 375/295 |
| 2010/0091989 A1 | 4/2010 | Yamashita | |
| 2010/0215373 A1* | 8/2010 | Iwamura et al. | 398/98 |

OTHER PUBLICATIONS

IEEE Standard for Information technology—Telecommunications and information exchange between systems—Local and metropolitan area networks—Specific requirements, 802.3-2008, "Part3: Carrier Sense Multiple Access with Collision Detection (CSMA/CD) access method and Physical Layer specifications" Clause 49.

* cited by examiner

FIG.4A Self-synchronizing scrambler
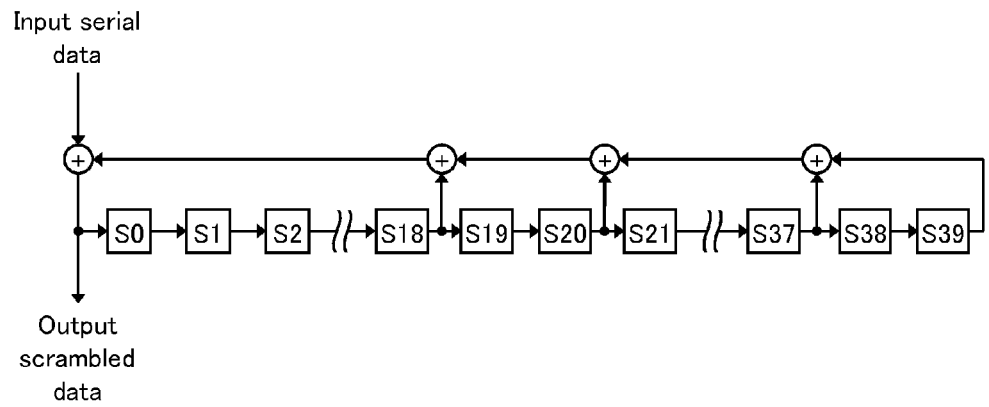
FIG.4B Self-synchronizing descrambler
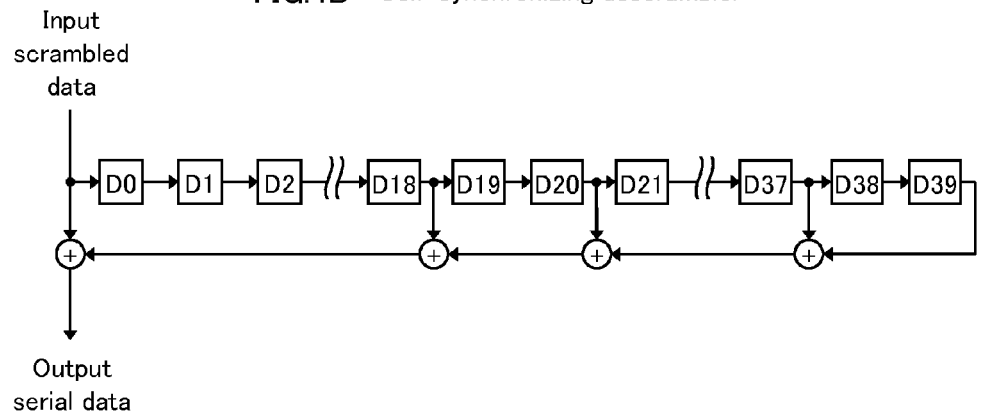

FIG.5

| Symbol name | Mnemonic | Function | (Hexadecimal) control character | (Binary) encoded symbol | |
|---|---|---|---|---|---|
| | | | | Current RD− | Current RD+ |
| K28.0 | – | – | 1C | 001111 0100 | 110000 1011 |
| K28.1 | SOP | Start of Packet | 3C | 001111 1001 | 110000 0110 |
| K28.2 | – | – | 5C | 001111 0101 | 110000 1010 |
| K28.3 | LIDL | Logical Idle | 7C | 001111 0011 | 110000 1100 |
| K28.4 | – | – | 9C | 001111 0010 | 110000 1101 |
| K28.5 | COM | Comma | BC | 001111 1010 | 110000 0101 |
| K28.6 | – | – | DC | 001111 0110 | 110000 1001 |
| K28.7 | – | – | FC | 001111 1000 | 110000 0111 |
| K23.7 | – | – | F7 | 111010 1000 | 000101 0111 |
| K27.7 | – | – | FB | 110110 1000 | 001001 0111 |
| K29.7 | EOP | End of Packet | FD | 101110 1000 | 010001 0111 |
| K30.7 | – | – | FE | 011110 1000 | 100001 0111 |

FIG.6

| Symbol set name | First symbol | Second symbol |
| --- | --- | --- |
| SOP | | SOP (K28.1) |
| EOP | | EOP (K29.7) |
| LIDL | COM (K28.5) | LIDL0 (K28.3) |
| | | LIDL1 (D16.7) |
| SYN | | SYN0 (D31.5) |
| | | SYN1 (D26.2) |

TRANSMISSION CIRCUIT, RECEPTION CIRCUIT, TRANSMISSION METHOD, RECEPTION METHOD, COMMUNICATION SYSTEM AND COMMUNICATION METHOD THEREFOR

TECHNICAL FIELD

The present invention relates to a transmitting circuit, a receiving circuit, a transmission method, a reception method, a communication system, and a communication method for the communication system for performing serial transmission using channel coding to carry out communications, and, in particular, to technology for achieving early establishment of synchronization and reduction of coding loss.

BACKGROUND ART

With recent development in technology for miniaturizing semiconductor devices and accelerating the processing speed thereof, the amount of data communicated between devices or LSIs (Large Scale Integrations) provided in the devices is increasing more than ever. With increasing amount of communicated data, it is desirable that the number of terminals (pads) required for data communications also increase. Nevertheless, a strict restriction is still posed on the number of terminals in an LSI, which affects the costs. For the purpose of achieving high-speed data communications with a fewer number of terminals in an LSI, the interface standards employing serial transmission have widely prevailed.

In the serial transmission scheme, it is common to superimpose information regarding clock edges onto serial data. It is therefore necessary to limit a run-length indicated by the number of consecutive bits each having a value of either "0" or "1". In this scheme, it is also desirable that transmission be performed with good DC balance, i.e. frequency of values "0" and "1" within a predetermined time period. In order to limit the run-length and maintain the DC balance, channel coding is used in the serial transmission.

One example of the channel coding is symbol mapping in which an m-bit data character is mapped to an n-bit (m<n) encoded symbol. Another example of the channel coding is scrambling in which a bit pattern of a data character of consecutive m bits is randomized to generate an encoded block.

Patent Literature 1 discloses 8B/10B coding as an example of the symbol mapping. Non-Patent Literature 1 discloses 64B/66B coding as an example of the scrambling.

Patent Literature 2 discloses technology for switching between the symbol mapping and the scrambling after error detection/correction bits are added using the scrambling so that a word length in coding in the scrambling matches that in the symbol mapping.

CITATION LIST

Patent Literature

[Patent Literature 1]
   U.S. Pat. No. 4,486,739
[Patent Literature 2]
   WO2008/059588

Non-Patent Literature

[Non-Patent Literature 1]
   IEEE Std 802.3-2008, "Part3: Carrier Sense Multiple Access with Collision Detection (CSMA/CD) access method and Physical Layer specifications", Clause 49

SUMMARY OF INVENTION

Technical Problem

The symbol mapping takes advantage of redundancy provided by extending m bits to n bits. For example, a COM (comma) symbol (K28.5) is defined in the 8B/10B coding. This means that, in the symbol mapping, a delimiter symbol having a unique bit pattern in serial data can be defined. In the symbol mapping, detection of a first bit of the encoded symbol within the serial data is facilitated by the presence of the delimiter symbol. That is to say, the symbol mapping has an advantage that symbol synchronization for performing serial-to-parallel conversion at a precise timing is achieved with ease and speed by the presence of the delimiter symbol. The symbol mapping, however, has a disadvantage that coding efficiency is low and data transfer efficiency is thus reduced, as a single data character is mapped to an encoded symbol by taking the run-length and the DC balance into consideration.

On the other hand, in the scrambling, a plurality of data characters are brought together, and a synchronization header that is shorter than a data length of a data character to be transmitted is added thereto. Therefore, it can be said that the coding efficiency of the scrambling is higher than that of the symbol mapping. For example, in the 8B/10B coding as an example of the symbol mapping, the number of redundant bits is two for each eight-bit data character, resulting in coding loss of 25% ($2/8$). On the other hand, in the 64B/66B coding as an example of the scrambling, the number of redundant bits is only two for each 64-bit data character, resulting in coding loss of only approximately 3% ($64/66$). In the scrambling, however, data characters are randomized by scrambling, and a unique bit pattern cannot be defined within serial data. The scrambling thus takes more time in establishing symbol synchronization (block synchronization) than the symbol mapping. For example, in the 64B/66B coding, a two-bit synchronization header is defined as "01" or "10". In order to establish symbol synchronization (block synchronization) in the scrambling, it is necessary to detect synchronization headers cyclically embedded for every 66 bits within serial data, for 64 or more blocks in succession. Accordingly, considering cases where symbol synchronization fails due to a transmission error and the like and where transmission is stopped in an idle period to save power, overheads required to restore symbol synchronization (block synchronization) increase in the scrambling. That is to say, the scrambling has such a problem that data transmission performance is significantly reduced.

The present invention has been conceived in view of the above-mentioned problem, and aims to achieve early establishment of symbol synchronization while suppressing reduction of data transmission efficiency occurring due to reduction of coding efficiency.

Solution to Problem

In order to solve the above-mentioned problem, a transmitting circuit according to the present invention is a transmitting circuit that performs channel coding and transmits channel-coded serial data to a receiving circuit via a serial channel, comprising: a first encoding circuit configured to perform first channel coding in which an m-bit control character is mapped to an n-bit (m<n) encoded symbol; a second encoding circuit configured to perform second channel coding in which a bit pattern of a data character is randomized by scrambling to generate an encoded block, the second channel coding taking more time in establishing synchronization with the receiving circuit and having less coding loss than the first channel coding; a transmission control unit configured to select one of the first encoding circuit and the second encoding circuit to be used for transmission; and a serial driver configured to, when the transmission control unit selects the first encoding circuit, convert the encoded symbol generated by the first encoding circuit into serial data and transmit the serial data via the serial channel, and to, when the transmission control unit selects the second encoding circuit, convert the encoded block generated by the second encoding circuit into serial data and transmit the serial data via the serial channel, wherein the transmission control unit selects the first encoding circuit in a period for not transmitting the data character, and selects the second encoding circuit in a period for transmitting the data character.

A receiving circuit according to the present invention is a receiving circuit that receives channel-coded serial data from a transmitting circuit via a serial channel, the channel-coded serial data being obtained by either first channel coding in which an m-bit control character is mapped to an n-bit (m<n) encoded symbol or second channel coding in which a bit pattern of a data character is randomized by scrambling to generate an encoded block, the second channel coding taking more time in establishing synchronization and having less coding loss than the first channel coding, the receiving circuit comprising: a first decoding circuit configured to decode the encoded symbol into the control character; a second decoding circuit configured to decode the encoded block into the data character by descrambling; a reception control unit configured to select one of the first decoding circuit and the second decoding circuit to be used for reception; and a serial receiver configured to convert the channel-coded serial data received via the serial channel into parallel data, and output the parallel data to one of the first decoding circuit and the second decoding circuit selected by the reception control unit, wherein the reception control unit selects the first decoding circuit in a period for not receiving the encoded block, and selects the second decoding circuit in a period for receiving the encoded block.

A communication system according to the present invention is a communication system that transmits channel-coded serial data from a transmitting circuit to a receiving circuit via a serial channel, wherein the transmitting circuit includes: a first encoding circuit configured to perform first channel coding in which an m-bit control character is mapped to an n-bit (m<n) encoded symbol; a second encoding circuit configured to perform second channel coding in which a bit pattern of a data character is randomized by scrambling to generate an encoded block, the second channel coding taking more time in establishing synchronization with the receiving circuit and having less coding loss than the first channel coding; a transmission control unit configured to select one of the first encoding circuit and the second encoding circuit to be used for transmission; and a serial driver configured to, when the transmission control unit selects the first encoding circuit, convert the encoded symbol generated by the first encoding circuit into serial data and transmit the serial data via the serial channel, and to, when the transmission control unit selects the second encoding circuit, convert the encoded block generated by the second encoding circuit into serial data and transmit the serial data via the serial channel, the transmission control unit selects the first encoding circuit in a period for not transmitting the data character, and selects the second encoding circuit in a period for transmitting the data character, the receiving circuit includes: a first decoding circuit configured to decode the encoded symbol into the control character; a second decoding circuit configured to decode the encoded block into the data character by descrambling; a reception control unit configured to select one of the first decoding circuit and the second decoding circuit to be used for reception; and a serial receiver configured to convert the channel-coded serial data received via the serial channel into parallel data, and output the parallel data to one of the first decoding circuit and the second decoding circuit selected by the reception control unit, and the reception control unit selects the first decoding circuit in a period for not receiving the encoded block, and selects the second decoding circuit in a period for receiving the encoded block.

A communication method according to the present invention is a communication method for use in a communication system that transmits channel-coded serial data from a transmitting circuit to a receiving circuit via a serial channel, wherein channel coding includes: first channel coding in which an m-bit control character is mapped to an n-bit (m<n) encoded symbol; and second channel coding in which a bit pattern of a data character is randomized by scrambling to generate an encoded block, the second channel coding takes more time in establishing synchronization between the transmitting circuit and the receiving circuit, and has less coding loss than the first channel coding, and the communication method for use in the communication system transmits the channel-coded serial data while switching between the first channel coding and the second channel coding, and uses the first channel coding in a period for not transmitting the encoded block, and uses the second channel coding in a period for transmitting the encoded block.

A transmission method according to the present invention is a transmission method for use in a transmitting circuit that performs channel coding and transmits channel-coded serial data to a receiving circuit via a serial channel, the transmission method comprising: a first encoding step of performing first channel coding in which an m-bit control character is mapped to an n-bit (m<n) encoded symbol; a second encoding step of performing second channel coding in which a bit pattern of a data character is randomized by scrambling to generate an encoded block, the second channel coding taking more time in establishing synchronization with the receiving circuit and having less coding loss than the first channel coding; a transmission control step of controlling transmission by selecting one of the first channel coding and the second channel coding to be used for transmission; and a transmission step of converting, when the transmission control step selects the first channel coding, the encoded symbol generated by the first encoding step into serial data and transmitting the serial data via the serial channel, and converting, when the transmission control step selects the second channel coding, the encoded block generated by the second encoding step into serial data and transmitting the serial data via the serial channel, wherein the transmission control step selects the first channel coding in a period for not transmitting the data character, and selects the second channel coding in a period for transmitting the data character.

A reception method according to the present invention is a reception method for use in a receiving circuit that receives channel-coded serial data from a transmitting circuit via a serial channel, the channel-coded serial data being obtained by either first channel coding in which an m-bit control character is mapped to an n-bit (m<n) encoded symbol or second channel coding in which a bit pattern of a data character is randomized by scrambling to generate an encoded block, the second channel coding taking more time in establishing synchronization and having less coding loss than the first channel coding, the reception method comprising: a first decoding step, by a first decoding circuit included in the receiving circuit, of decoding the encoded symbol into the control character; a second decoding step, by a second decoding circuit included in the receiving circuit, of decoding the encoded block into the data character by descrambling; a reception control step of selecting one of the first decoding circuit and the second decoding circuit to be used for reception; and an output step of converting the channel-coded serial data received via the serial channel into parallel data, and output the parallel data to one of the first decoding circuit and the second decoding circuit selected by the reception control step, wherein the reception control step selects the first decoding circuit in a period for not receiving the encoded block, and selects the second decoding circuit in a period for receiving the encoded block.

Advantageous Effects of Invention

The present invention achieves early establishment of symbol synchronization while suppressing reduction of data transfer efficiency occurring due to reduction of coding efficiency.

BRIEF DESCRIPTION OF DRAWINGS

FIGS. 4A and 4B respectively illustrate examples of the structures of a scrambler and a descrambler in the communication system according to the embodiment.

FIG. 5 is a table showing allocation of functions to special symbols in 8B/10B coding.

FIG. 6 shows an example of a symbol set for control used in the communication system according to the embodiment.

DESCRIPTION OF EMBODIMENTS

Embodiment

The following describes a communication system as an embodiment of the present invention with reference to the drawings.

Figure 1:
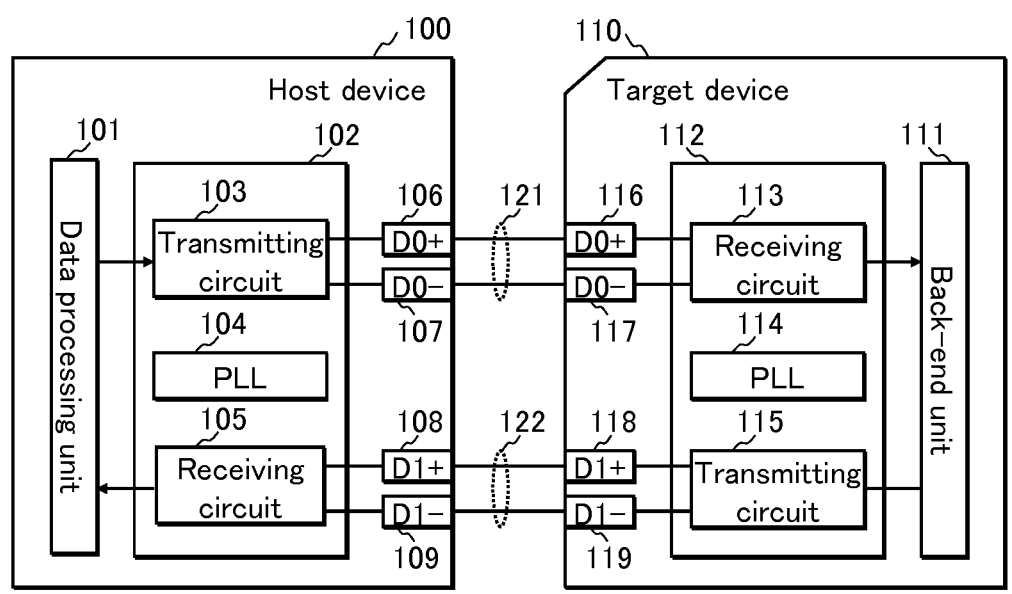
FIG. 1 is a block diagram illustrating an example of the overall structure of a communication system according to an embodiment.

FIG. 1 is a block diagram illustrating an example of the structure of the communication system.

As illustrated in FIG. 1, the communication system includes a host device 100 and a target device 110. The host device 100 and the target device 110 are connected to each other via serial channels 121 and 122.

Each of the serial channels 121 and 122 is a pair of signal lines used for data transmission in differential signaling. The serial channel 121 includes signal lines D0+ and D0−, and is used to perform data transmission from the host device 100 to the target device 110. Similarly, the serial channel 122 includes signal lines D1+ and D1−, and is used to perform data transmission from the target device 110 to the host device 100. In a case where a differential signal is transmitted, antiphase signals relative to signals passing though the signal lines D0+ and D1+ pass through the respective signal lines D0− and D1− in principle.

The host device 100 includes a data processing unit 101, an interface circuit 102, a D0+ terminal 106, a D0− terminal 107, a D1+ terminal 108, and a D1− terminal 109.

The data processing unit 101 performs data processing in data transmission using the interface circuit 102. For example, the data processing unit 101 designates data to be transmitted and transmits the designated data to the interface circuit 102, or performs processing of data transmitted from the interface circuit 102.

The interface circuit 102 includes a transmitting circuit 103, a PLL (Phase Locked Loop) 104, and a receiving circuit 105.

In an idle period for not transmitting actual data (also referred to as valid data or a packet payload) to the target device 110, the transmitting circuit 103 performs 8B/10B coding to transmit a control signal and the like to the target device 110. On the other hand, in a period for transmitting actual data received from the data processing unit 101 to the target device 110, the transmitting circuit 103 performs scrambling to transmit actual data to the target device 110. The detailed structure of the transmitting circuit 103 is described later with use of FIG. 2.

The PLL 104 generates a clock used for the interface circuit 102 to perform data transmission.

The receiving circuit 105 receives, via the D1+ terminal 108 and the D1− terminal 109, a differential signal transmitted from the target device 110 to the serial channel 122, and decodes a control signal or actual data. The receiving circuit 105 receives a control signal encoded using the 8B/10B coding, and decodes the received control signal using the 8B/10B coding. In a period for receiving actual data, the receiving circuit 105 switches the coding scheme to the scrambling to decode the received actual data.

The target device 110 includes a back-end unit 111, an interface circuit 112, a D0+ terminal 116, a D0− terminal 117, a D1+ terminal 118, and a D1− terminal 119.

The back-end unit 111 performs data processing in data transmission using the interface circuit 112. The back-end unit 111 reads, from a recording medium (not illustrated), data to be transmitted and outputs the read data to the interface circuit 112, or writes data output from the interface circuit 112 into the recording medium.

The interface circuit 112 includes a receiving circuit 113, a PLL 114, and a transmitting circuit 115.

The receiving circuit 113 receives, via the D0+ terminal 116 and the D0− terminal 117, a differential signal transmitted from the host device 100 to the serial channel 121, and performs decoding. The receiving circuit 113 receives a control signal encoded using the 8B/10B coding, and decodes the received control signal using the 8B/10B coding. In the period for receiving actual data, the receiving circuit 113 switches the coding scheme to the scrambling to decode the received actual data. Details of the receiving circuit 113 are described later with use of FIG. 3.

The PLL 114 generates a clock used for the interface circuit 112 to perform data transmission.

The transmitting circuit 115 transmits, by an instruction from the back-end unit 111, the control signal and the like encoded using the 8B/10B coding to the host device 100 in the idle period for not transmitting actual data (a packet payload) to the host device 100. The transmitting circuit 115 transmits, using a differential signal, the control signal and the like encoded using the 8B/10B coding to the host device 100 via the D1+ terminal 118 and the D1− terminal 119. On the other hand, when transmitting the actual data received from the back-end unit 111 to the host device 100, the transmitting circuit 115 encodes the actual data using the scrambling, and transmits the encoded actual data to the host device 100. The transmitting circuit 115 transmits, using a differential signal, the actual data encoded using the scrambling to the host device 100 via the D1+ terminal 118 and the D1− terminal 119.

Figure 2:
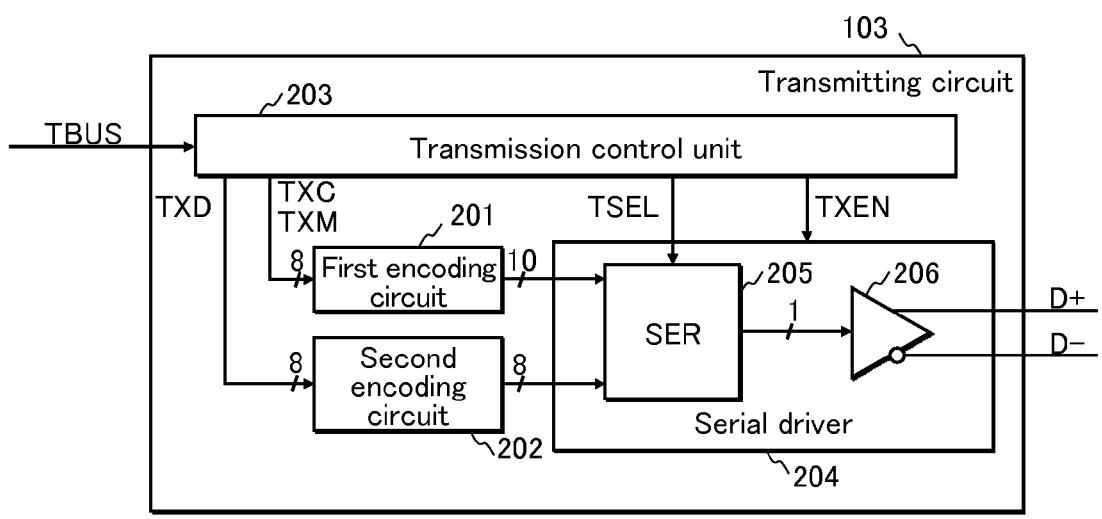
FIG. 2 is a block diagram illustrating an example of the detailed structure of a transmitting circuit in the communication system according to the embodiment.

FIG. 2 illustrates an example of the detailed structure of the transmitting circuit 103 included in the host device 100. The following describes the transmitting circuit 103 with use of FIG. 2. The transmitting circuit 115 included in the target device 110 has a similar structure to the transmitting circuit 103 except that transmission data is input not from the data processing unit 101 but from the back-end unit 111, and a terminal to which the transmission data is output is different. Description on an example of the detailed structure of the transmitting circuit 115 is thus omitted.

As illustrated in FIG. 2, the transmitting circuit 103 includes a first encoding circuit 201, a second encoding circuit 202, a transmission control unit 203, and a serial driver 204.

The first encoding circuit 201 maps an eight-bit control character (TXC: TX Control character) input from the transmission control unit 203 to a 10-bit encoded symbol. Furthermore, the first encoding circuit 201 outputs the 10-bit encoded symbol generated as a result of the mapping to the serial driver 204.

The second encoding circuit 202 receives, as input, a data character (TXD: TX Data character) of consecutive eight bits from the transmission control unit 203. The second encoding circuit 202 scrambles the input data character (TXD: TX Data character) of consecutive eight bits into an eight-bit encoded block according to a predetermined scrambling polynomial. Furthermore, the second encoding circuit 202 outputs the generated eight-bit encoded block to the serial driver 204.

In the idle period during which there is no transmission request via a transmission bus (TBUS), the transmission control unit 203 selects the first encoding circuit 201 by setting a transmission selection signal (TSEL) to Low. As used herein, the phrase "the transmission control unit 203 selects the first encoding circuit 201" means that the transmission control unit 203 causes a serializer (SER: Serializer) 205 to process the encoded symbol output from the first encoding circuit 201.

In order to transmit the encoded symbol in the idle period, the transmission control unit 203 outputs the eight-bit control character (TXC) to the first encoding circuit 201. The transmission control unit 203 uses, as the encoded symbol having been encoded using the 8B/10B coding, a D symbol and a K symbol in combination with each other. The D symbol indicates a normal data byte, whereas the K symbol is a symbol for control. In this case, the transmission control unit 203 also outputs a one-bit encoding mode (TXM: TX coding Mode) for identifying one of the D symbol and the K symbol into which a character is encoded.

When there is a transmission request via the transmission bus (TBUS), the transmission control unit 203 switches the encoding circuit to the second encoding circuit 202 by setting the transmission selection signal (TSEL) to High upon output of an encoded symbol indicating a start position of a packet (SOP: Start Of Packet). The transmission control unit 203 then outputs transmission data (packet payload) transmitted via the transmission bus (TBUS) to the second encoding circuit 202 as the eight-bit data character (TXD). The transmission control unit 203 switches the encoding circuit to the first encoding circuit 201 by setting the transmission selection signal (TSEL) to Low again upon transmission of an encoded block terminating the packet payload. The transmission control unit 203 completes packet transmission by transmitting an encoded symbol indicating an end position of the packet.

The transmission control unit 203 stores therein a predetermined packet size (e.g. 512 bytes) as a data size of a packet of valid data to be transmitted to the receiving circuit 113. Upon transmission of a packet of the above-mentioned data size, the transmission control unit 203 switches from the second encoding circuit 202 to the first encoding circuit 201. That is to say, the transmission control unit 203 switches the transmission selection signal (TSEL) from High to Low. When there is any residual valid data transmitted via the transmission bus (TBUS), the transmission control unit 203 transmits the SOP again, and then switches from the first encoding circuit 201 to the second encoding circuit 202 to perform data transmission.

The serial driver 204 converts parallel data into serial data, and outputs the serial data via the serial channel 121. The serial driver 204 includes the SER 205 and a differential driver 206.

The SER 205 selects one of a signal output from the first encoding circuit 201 and a signal output from the second encoding circuit 202 according to an instruction indicated by the transmission selection signal (TSEL) transmitted from the transmission control unit 203. Furthermore, the SER 205 converts the encoded symbol or the encoded block input thereto into serial data, and transmits the serial data to the differential driver 206. Specifically, the SER 205 selects a signal output from the first encoding circuit 201 when the transmission selection signal (TSEL) indicates Low and selects a signal output from the second encoding circuit 202 when the transmission selection signal (TSEL) indicates High.

The differential driver 206 converts the serial data output from the SER 205 into a differential signal, and outputs the differential signal to the serial channel 121 via the D0+ terminal 106 and the D0− terminal 107.

The differential driver 206 can generally include an analog circuit operated by a constant current source. The differential driver 206 thus consumes power even in the idle period for not transmitting valid data. For this reason, the transmission control unit 203 also has a function to control an enable signal (TXEN) for the serial driver 204 so that a transmission operation is stopped in the idle period. When the transmission operation is stopped by setting the enable signal (TXEN) to Low, the differential driver 206 pulls up or down potentials on both signal lines constituting the serial channel 121 to set differential amplitude, which is a difference between potentials of signals flowing through the both signal lines, to 0 V. The differential driver 206 may pull down the potentials by fixing an output potential of the differential driver 206 at a ground level, for example. Alternatively, the differential driver 206 may pull down the potentials by being put into a high impedance state and fixing the output potential of the differential driver 206 at a ground level by using a separate pull-down resistor. Furthermore, a pull-up resistor may include an on-chip resistor formed from a transistor within a semiconductor chip.

Figure 3:
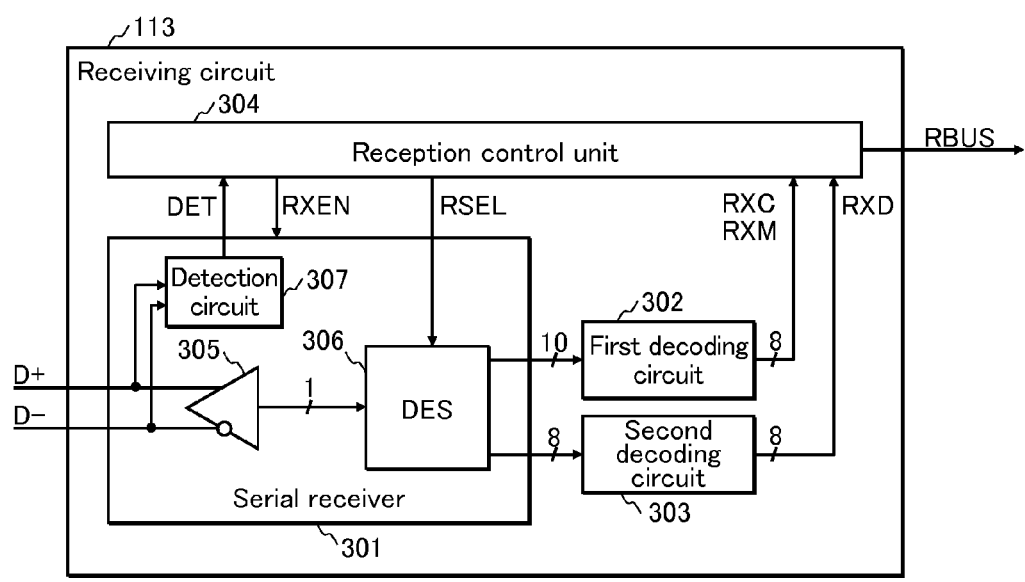
FIG. 3 is a block diagram illustrating an example of the detailed structure of a receiving circuit in the communication system according to the embodiment.

FIG. 3 illustrates an example of the detailed structure of the receiving circuit 113. The following describes the receiving circuit 113 with use of FIG. 3. Note that the receiving circuit 105 has a similar structure to the receiving circuit 113 except that reception data has been output not from the data processing unit 101 but from the back-end unit 111, and a terminal receiving the reception data is different. Description on an example of the detailed structure of the receiving circuit 105 is thus omitted.

As illustrated in FIG. 3, the receiving circuit 113 includes a serial receiver 301, a first decoding circuit 302, a second decoding circuit 303, and a reception control unit 304.

The serial receiver 301 converts serial data received via the serial channel 121 into parallel data, and outputs the parallel data to the first decoding circuit 302 or the second decoding circuit 303.

The serial receiver 301 includes a differential receiver 305 and a de-serializer (DES: DE-Serializer) 306.

The differential receiver 305 outputs, as serial data, a differential signal received via the serial channel 121 to the de-serializer 306.

The de-serializer 306 converts the serial data input thereto into parallel data, and outputs the parallel data to the first decoding circuit 302 or the second decoding circuit 303 according to a reception selection signal (RSEL) output from the reception control unit 304. Specifically, the de-serializer 306 outputs the parallel data as a 10-bit encoded symbol to the first decoding circuit 302 when the reception selection signal (RSEL) is Low. The de-serializer 306 outputs the parallel data as an eight-bit encoded block to the second decoding circuit 303 when the reception selection signal (RSEL) is High.

The first decoding circuit 302 receives, as input, the 10-bit encoded symbol from the serial receiver 301. The first decoding circuit 302 further decodes the 10-bit encoded symbol input thereto into an eight-bit control character (RXC: RX Control character) according to the 8B/10B coding. In this case, the first decoding circuit 302 passes, to the reception control unit 304, a decoding mode (RXM: RX coding Mode) indicating whether the decoded encoded symbol is a K symbol or a D symbol.

The second decoding circuit 303 receives, as input, an eight-bit encoded block having been scrambled using the second channel coding from the serial receiver 301. The second decoding circuit 303 further decodes the eight-bit encoded block input thereto into an eight-bit data character (RXD: RX Data character) by descrambling.

The reception control unit 304 has a function to switch between the first decoding circuit 302 and the second decoding circuit 303, and a function to receive the data character having been decoded by the second decoding circuit 303 and output the received data character via a reception bus (RBUS).

At initialization and restoration from a power-saving state, the reception control unit 304 sets the reception selection signal (RSEL) to Low to select the first decoding circuit 302 until symbol synchronization is established. After symbol synchronization is established, the reception control unit 304 continues selecting the first decoding circuit 302 by setting the reception selection signal (RSEL) to Low, as long as an encoded symbol indicating the idle period is received.

Upon reception of an encoded symbol indicating a start position of a packet, the reception control unit 304 sets the reception selection signal (RSEL) to High to switch the decoding circuit to the second decoding circuit 303. Upon reception of an encoded block of a predetermined size terminating a packet payload, the reception control unit 304 sets the reception selection signal (RSEL) to Low to switch the decoding circuit to the first decoding circuit 302. The reception control unit 304 completes packet reception upon reception of an encoded symbol indicating an end position of a packet.

The reception control unit 304 also stores therein information on a predetermined packet size (e.g. 512 bytes) as a packet size of valid data transmitted from the transmitting circuit 103. Upon reception of a packet of the predetermined packet size after the second decoding circuit 303 is selected, the reception control unit 304 switches the decoding circuit to the first decoding circuit 302. In the present embodiment, each of the transmitting circuit 103 and the receiving circuit 113 stores therein a transmission size (the predetermined packet size) of valid data. With this structure, in the present embodiment, valid data is accurately transmitted from the transmitting circuit 103 to the receiving circuit 113, and the receiving circuit 113 appropriately switches from the second decoding circuit 303 to the first decoding circuit 302.

A detection circuit 307 obtains differential amplitude from potentials on both signal lines constituting the serial channel 121, and, when the detected signal is a Low fixed signal or a High fixed signal, notifies the reception control unit 304 accordingly. The notification from the detection circuit 307 triggers transition to the power-saving state or restoration from the power-saving state. Details thereof, however, are described later in a first modification.

FIG. 4A illustrates the structure of a scrambler used for the scrambling performed by the second encoding circuit 202, and FIG. 4B illustrates the structure of a descrambler used for the descrambling performed by the second decoding circuit 303.

FIG. 4A illustrates the structure of the scrambler when a generating polynomial is represented by $X^{40}+X^{38}+X^{21}+X^{19}+1$. The scrambler illustrated in FIG. 4A is one example of the structure of the second encoding circuit 202.

FIG. 4B illustrates a descrambler corresponding to the scrambler illustrated in FIG. 4A. FIG. 4B illustrates the structure of the descrambler when the generating polynomial is represented by $X^{40}+X^{38}+X^{21}+X^{19}+1$. The descrambler illustrated in FIG. 4B is one example of the structure of the second decoding circuit 303.

The scrambler in FIG. 4A and the descrambler in FIG. 4B are respectively a self-synchronizing scrambler and a self-synchronizing descrambler each initialized by input data. The scrambler and the descrambler are each embodied by a linear feedback shift register.

In FIGS. 4A and 4B, S0 to S39 and D0 to D39 each represent a shift register, and a plus sign "+" represents bitwise exclusive or. In FIGS. 4A and 4B, each shift register is required to shift by synchronization with a serial clock (SCLK: Serial Clock). Processing equivalent to that illustrated in each of FIGS. 4A and 4B, however, may be performed in parallel by synchronization with a parallel clock (PLCK: Parallel Clock), which is slower than the serial clock synchronization. Shift registers S3 to S17, S22 to S36, D3 to D17, and D22 to D36 are omitted from FIGS. 4A and 4B.

In the present embodiment, the scrambler illustrated in FIG. 4A receives an eight-bit data character as input, and scrambles the eight-bit data character into an eight-bit encoded block. The descrambler illustrated in FIG. 4B receives an eight-bit encoded block as input, and descrambles the eight-bit encoded block into an eight-bit data character.

The self-synchronizing scrambler and the self-synchronizing descrambler respectively illustrated in FIGS. 4A and 4B are each required to be initialized so that the shift registers S0 to S39 and D0 to D39 share the same value. To this end, in the transmitting circuit, an encoded symbol transmitted in a period during which the first encoding circuit 201 is selected is input into the scrambler illustrated in FIG. 4A, which is the second encoding circuit 202. By doing so, the shift registers S0 to S39 are initialized before input of the data character (TXD). Similarly, in the receiving circuit, an encoded symbol received in a period during which the first decoding circuit 302 is selected is input into the descrambler illustrated in FIG. 4B, which is the second decoding circuit 303. In this way, the shift registers D0 to D39 are initialized to have the same value as the shift registers S0 to S39 by using the encoded symbol received via the channels.

With this structure, the second encoding circuit 202 can scramble an eight-bit data character, and the second decoding circuit 303 can descramble an eight-bit encoded block.

<Data>

The following describes the encoded symbol having been encoded using the 8B/10B coding. In the present embodiment, in the 8B/10B coding employed as the first channel coding, eight-bit data is converted into 10-bit data. In the 8B/10B coding, by taking advantage of redundancy of two-bit data generated by the above-mentioned conversion, a special K symbol for controlling communications between a transmitter and a receiver is usable in addition to a D symbol representing normal eight-bit data.

Regarding the special K symbol, FIG. 5 shows correspondences among a "symbol name", a "mnemonic", a "function", a "(hexadecimal) control character", and a "(binary) encoded symbol" for each K symbol.

The "symbol name" indicates a name given to a corresponding K symbol for convenience sake.

The "mnemonic" indicates a notational example of a corresponding K symbol when the K symbol is expressed in mnemonic form. In many cases, a notation relating to a function of the K symbol is used.

The "function" indicates a function defined by a corresponding K symbol. The function refers to a function required in communications. Examples of the function are notification of a start of packet transmission and notification of an end of a packet.

The "control character" indicates a notation when a corresponding K symbol is expressed in hexadecimal.

The "encoded symbol" indicates a notation when a corresponding K symbol is expressed by a binary encoded symbol. The K symbol transmitted from a transmitter to a receiver is the encoded symbol.

FIG. 5 shows K symbols "K28.1", "K28.3", "K28.5", and "K29.7". The following describes details thereof.

A COM (Comma) symbol (K28.5) is a symbol used as a delimiter to perform symbol synchronization. This is because the COM symbol has a unique signal pattern that cannot be generated from any combination of other two encoded symbols within serial data including encoded symbol sequences having been encoded using the 8B/10B coding. The symbol synchronization refers to a state where a receiver in serial data transmission recognizes positions (first bits) at which serial data is delimited into encoded symbols, and properly receives the encoded symbols as parallel data.

An SOP (Start Of Packet) symbol (K28.1) is used to cause the receiver to recognize a start position of a packet, and is added to the start position. Upon receiving the SOP, the receiver recognizes that the following data is actual data (packet payload).

An EOP (End Of Packet) symbol (K29.7) is used to cause the receiver to recognize an end position of a packet, and is added to the end position. Although recognizing the end position by receiving a packet of a predetermined size, the receiver properly recognizes that data transmission of a packet payload is actually completed by receiving the EOP.

An LIDL (Logical Idle) symbol (K28.3) is a logical idle signal output in the idle period for not transmitting data, and is used to maintain symbol synchronization in the idle period.

The symbol synchronization is necessary not only at initialization and restoration from a power-saving state but also at restoration from an unforeseen transmission error state. It is therefore desirable that the COM symbol used as a delimiter to perform symbol synchronization be transmitted on a regular basis. In the present embodiment, a symbol set generated by combining the COM symbol with an encoded symbol other than the COM symbol is used. With this structure, in the present embodiment, the COM symbol is surely transmitted on a regular basis, and other D symbols are used to give notification of the idle period, and a start position and an end position of a packet.

FIG. 6 shows examples of the symbol set used in the present embodiment. In FIG. 6, an SYN (Synchronization) symbol set includes the COM symbol (K28.5) and a particular D symbol (D31.5). The SYN (Synchronization) symbol set is transmitted for a predetermined time period to establish symbol synchronization at the initialization and the restoration from a power-saving state. As shown in FIG. 6, the first symbol of each symbol set is the COM symbol (K28.5), and the second symbol of each symbol set is a symbol other than the COM symbol. By transmitting the control characters in units of symbol sets, communication control on regular transmission of the COM symbol and notification of a start position and an end position of a packet is achieved. Hereinafter, unless particularly distinguished, the SOP, the EOP, the LIDL, and the SYN represent symbol sets corresponding to respective symbol set names shown in FIG. 6.

<Operation>

Figure 7:
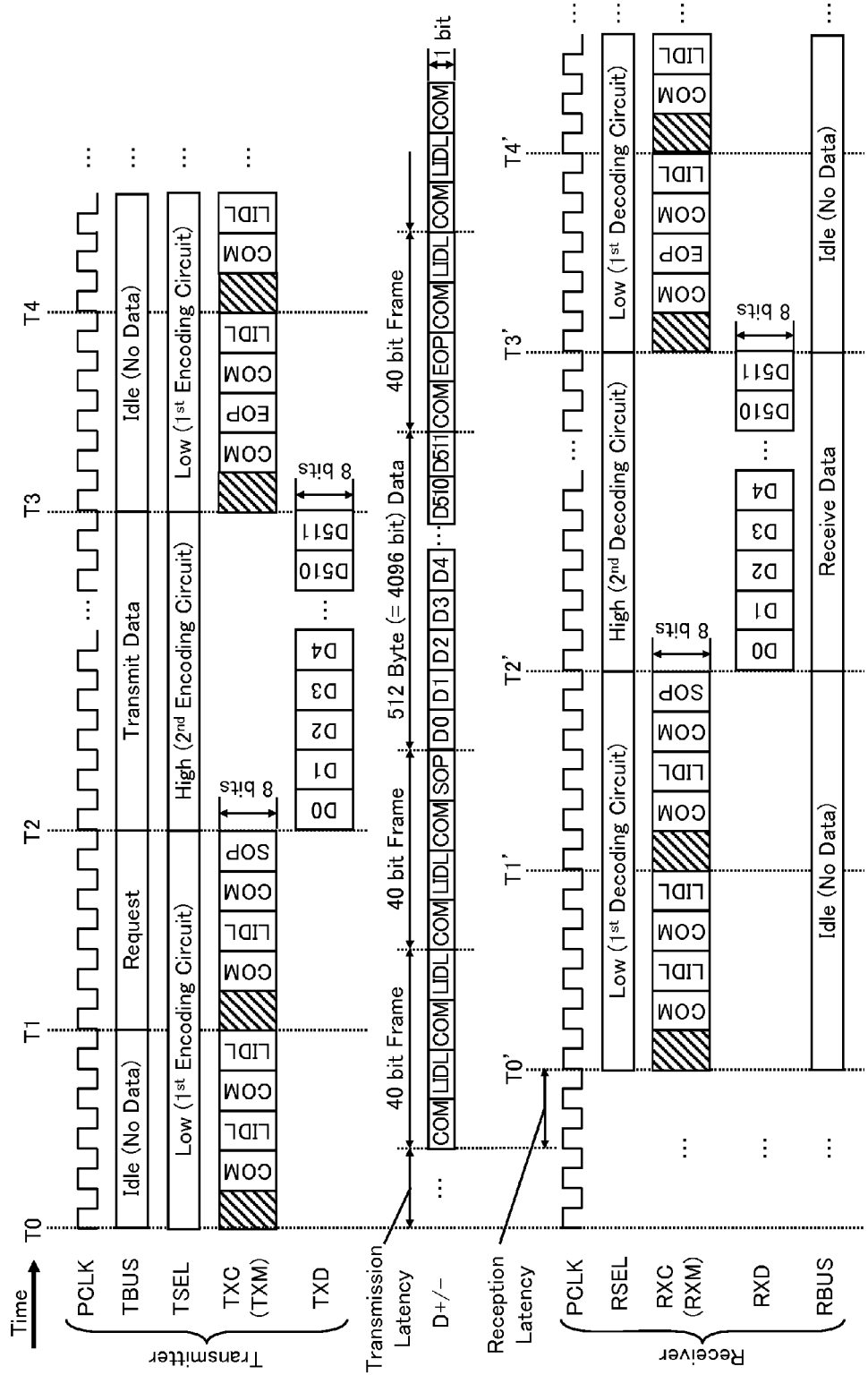
FIG. 7 is a timing diagram illustrating an example of an operation of the communication system according to the embodiment.

The following describes an operation of the communication system according to the present embodiment with use of a timing diagram illustrated in FIG. 7. In the following description on the operation of the communication system, the functional block diagrams of FIGS. 1, 2, and 3 are used as well. In the present embodiment, data transmission from the host device 100 to the target device 110 is described. Since data transmission from the target device 110 to the host device 100 is similar to the data transmission from the host device 100 to the target device 110, the detailed explanation thereof is omitted in the present description.

The horizontal axis in FIG. 7 indicates time. In FIG. 7, signals collectively indicated by the term "Transmitter" (PCLK, TBUS, TSEL, TXC (TXM), and TXD) are signals used in the transmitting circuit. On the other hand, in FIG. 7, signals collectively indicated by the term "Receiver" (PCLK, RSEL, RXC (RXM), RXD, and RBUS) are signals used in the receiving circuit. The other signals are signals flowing through the serial channel 121.

<Operation of Transmitting Circuit>

The transmission control unit 203 receives, as input, transmission data via the transmission bus (TBUS) by synchronization with the PCLK, and outputs the received transmission data to the second encoding circuit 202 an eight-bit data character (TXD) at a time. Upon receiving the eight-bit data character (TXD) as input, the second encoding circuit 202 converts the eight-bit data character into an eight-bit encoded block and outputs the eight-bit encoded block to the serial driver 204. The serial driver 204 converts the eight-bit encoded block input by synchronization with the PCLK into serial data by synchronization with the SCLK (Serial Clock), which has a frequency eight times higher than that of the PCLK. The serial driver 204 outputs, as a differential signal, the serial data generated as a result of the conversion via the D0+ terminal 106 and the D0− terminal 107. As described above, when a frequency ratio of the PCLK to the SCLK is 1:8, data transmission is performed with no interruption of transmission data caused by excessively high-speed conversion processing and with no delay caused by excessively low-speed conversion processing.

The first encoding circuit 201 converts an eight-bit control character (TXC) input from the transmission control unit 203 by synchronization with the PCLK into a 10-bit encoded symbol, and outputs the 10-bit encoded symbol to the serial driver 204. The serial driver 204 converts the 10-bit encoded symbol input by synchronization with the PCLK into serial data by synchronization with the SCLK, which has a frequency eight times higher than that of the PCLK. Since the serial driver 204 can convert only eight bits of the 10-bit data into the serial data for one PCLK, a surplus of two bits is generated, leading to delay. This means that, when a control character is transmitted, the serial driver 204 cannot output the encoded symbol input thereto as serial data at the same speed as a speed at which the encoded symbol is input. To address the problem, the transmission control unit 203 generates a 40-bit coding frame in a period during which the first encoding circuit 201 is selected. The bit length of the 40-bit coding frame is equal to the least common multiple of the bit length of the encoded symbol (10) and the bit length of the encoded block (8). The transmission control unit 203 performs control so that encoded symbols are transmitted in units of 40-bit coding frames thus generated. In order to output the 40-bit coding frame, a cycle time of five cycles of the PCLK is necessary. The transmission control unit 203 therefore provides a standby time of one cycle each time four control characters (TXCs) corresponding to a coding frame are output in a cycle time of four cycles of the PCLK. With this structure, all the coding frames output from the first encoding circuit 201 by synchronization with the PCLK are output from the serial driver 204 by synchronization with the SCLK. That is to say, by providing the standby time of one cycle, the host device 100 can absorb, for each one cycle, the surplus of two bits generated each time a 10-bit encoded symbol is transmitted.

[Time T0 to Time T1]

A period between Time T0 and Time T1 is an idle period during which there is no transmission request via the transmission bus (TBUS). In the idle period, the transmission control unit 103 selects the first encoding circuit 201 by setting the transmission selection signal (TSEL) to Low. The first encoding circuit 201 repeatedly outputs a symbol set generated by combining the COM for the symbol synchronization with the LIDL as the idle signal, according to the 8B/10B coding. Furthermore, the serial driver 204 transmits, to the receiving circuit 113, a coding frame generated by converting a symbol set including the COM and the LIDL into the serial data. Hereinafter, description is made on the assumption that each control character is a symbol set including the COM and another symbol, and explanation thereof is omitted.

As illustrated in FIG. 7, a signal transmitted from the transmitting circuit 103 reaches the receiving circuit 113 with a slight delay (transmission latency, reception latency) from the time of transmission.

[Time T1 to Time T3]

Upon reception of a transmission request via the transmission bus (TBUS) at Time T1, the transmission control unit 203 performs control so that a coding frame including the SOP indicating a start position of a packet is transmitted. The transmission control unit 203 then switches the transmission selection signal (TSEL) to High at Time T2, and outputs transmission data transmitted via the transmission bus (TBUS) to the second encoding circuit 202 as an eight-bit data character (TXD) at a time. Following the 40-bit coding frame that is input from the first encoding circuit 201 and includes the SOP, the serial driver 204 continuously outputs eight-bit encoded blocks input from the second encoding circuit 202.

[At and After Time T3]

At Time T3, the transmission control unit 203 completes transmission of the data character (TXD) of a predetermined packet size. The transmission control unit 203 switches the transmission selection signal (TSEL) to Low to select the first encoding circuit 201, and performs control so that the coding frame including the EOP indicating an end position of a packet is transmitted. At and after Time T4, the transmission control unit 203 performs control so that a coding frame that includes the LIDL and indicates the idle period is transmitted, as in the period between Time T0 and Time T1.

When a size of the transmission data transmitted via the transmission bus (TBUS) exceeds a predetermined packet size, the transmission request via the transmission bus (TBUS) continues at Time T3. As a result, the transmitting circuit 103 once switches from the second encoding circuit 202 to the first encoding circuit 201, and transmits a coding frame including the SOP as in the period between Time T1 and Time T2. The transmitting circuit 103 then switches the encoding circuit to the second encoding circuit 202 again, and the second encoding circuit 202 encodes residual transmission data an eight-bit data character (TXD) at a time. The transmitting circuit 103 continuously outputs encoded blocks generated as a result of encoding from the serial driver 204.

<Operation of Receiving Circuit>

When the receiving circuit 113 receives packets, transmission latency to perform transmission from the transmitting circuit 103 to the serial channel 121 occurs. When the receiving circuit 113 receives packets, reception latency to perform reception from the serial channel 121 occurs as well. Therefore, in FIG. 7, Time T0 to Time T4 with respect to the transmitting circuit 103 respectively correspond to Time T0' to Time T4' with respect to the receiving circuit 113.

The reception control unit 304 included in the receiving circuit 113 selects the first decoding circuit 302 by setting the reception selection signal (RSEL) to Low. In this period, the serial receiver 301 outputs serial data received via the serial channel 121 by synchronization with the SCLK to the first decoding circuit 302 as a 10-bit encoded symbol by synchronization with the PCLK. Similarly to the transmitting circuit 103, the frequency ratio of the PCLK to the SCLK is assumed to be 1:8 in the receiving circuit 113. As a result, only eight bits of the 10-bit encoded symbol can be received in a cycle time of one cycle of the PCLK. To address the problem, the serial receiver 301 outputs a coding frame including four encoded symbols to the second decoding circuit 303 for every five cycles of the PCLK.

On the other hand, in a period during which the reception control unit 304 selects the second decoding circuit 303 by setting the reception selection signal (RSEL) to High, the reception control unit 304 continuously outputs encoded blocks to the second decoding circuit 303 by synchronization with the PCLK, since the serial receiver 301 can receive an eight-bit encoded block in a cycle time of one cycle of the PCLK.

[Time T0' to Time T1']

The reception control unit 304 included in the receiving circuit 113 selects the first decoding circuit 302 at Time T0' by setting the reception selection signal (RSEL) to Low, since it is the idle period before data reception. At Time T0', the serial receiver 301 starts receiving a coding frame including the LIDL. The first decoding circuit 302 converts the 10-bit encoded symbol input from the serial receiver 301 into an eight-bit control character (RXC). The first decoding circuit 302 outputs the control character to the reception control unit 304 along with the decoding mode (RXM) indicating whether the received encoded symbol is a K symbol or a D symbol. The reception control unit 304 confirms that the idle period is continued by receiving the control character (RXC) or the decoding mode (RXM) corresponding to the LIDL.

[Time T1' to Time T3']

A coding frame including the SOP is received in a period between Time T1' and Time T2'. Triggered by reception of the SOP at Time T2' at which the reception of the encoded symbol including the SOP is completed, the reception control unit 304 switches the reception selection signal (RSEL) to High. Thereafter, the serial receiver 301 outputs an eight-bit encoded block, at a time, of the serial data received via the serial channel 121 to the second decoding circuit 303 by synchronization with the PCLK. The second decoding circuit 303 descrambles the encoded block input thereto into the data character (RXD), and inputs the data character into the reception control unit 304. The reception control unit 304 outputs the data character as the reception data via the reception bus (RBUS).

[At and After Time T3']

Upon completion of reception of the data character (RXD) of a predetermined packet size at Time T3', the reception control unit 304 switches the reception selection signal (RSEL) to Low to select the first decoding circuit 302, and performs reception of the coding frame including the EOP. After completing the reception of the coding frame including the EOP at Time T4', the reception control unit 304 continues reception of the coding frame including the LIDL as in the period between Time T0' and Time T1'. When data transmission from the transmitting circuit 113 continues at and after Time T3', the coding frame including the SOP is received again. As a result, the reception control unit 304 performs data reception as in the period between Time T2' and Time T3'.

<Summary>

According to the present embodiment, the transmitting circuit 103 (115) and the receiving circuit 113 (105) corresponding thereto do not influence the transmission efficiency. This means that, in the present embodiment, in the idle period for not transmitting valid data, symbol synchronization is maintained by repeatedly transmitting an idle signal in the 8B/10B format. Furthermore, in the present embodiment, even when symbol synchronization fails due to a communication error or other factors, early restoration of symbol synchronization is achieved. In the present embodiment, at the time of transmitting the valid data, data is efficiently transmitted using the scrambling having no coding loss.

<First Modification>

The following describes a first modification of the communication system according to the present invention with reference to the drawings. In the embodiment described above, in the idle period for not transmitting valid data, the coding frame including the LIDL is repeatedly transmitted to maintain symbol synchronization. In the embodiment described above, however, it can be said that power is wastefully consumed as the transmission of the coding frame is continued even to maintain symbol synchronization. In the first modification, the structure that reduces power consumption is described.

<Structure>

The structure itself is similar to that shown in the embodiment described above. Although not shown in detail in the embodiment described above, in the interface circuit in the first modification, the transmission control unit 203 has a function to put the transmitting circuit 103 (115) into a power-saving state. The receiving circuit 113 (105) has a function to transition to the power-saving state and a function to be activated from the power-saving state, upon notification from the transmitting circuit 103 (115). More specifically, each of the enable signal (TXEN) for the serial driver 204 included in the transmitting circuit shown in FIG. 2 and the enable signal (RXEN) for the serial receiver 301 shown in FIG. 3 is Enable at all times in the embodiment described above. The first modification, however, is different from the embodiment described above in that the enable signals are controlled by the transmission control unit and the reception control unit to be Disable in the idle period.

<Operation>

Figure 8:
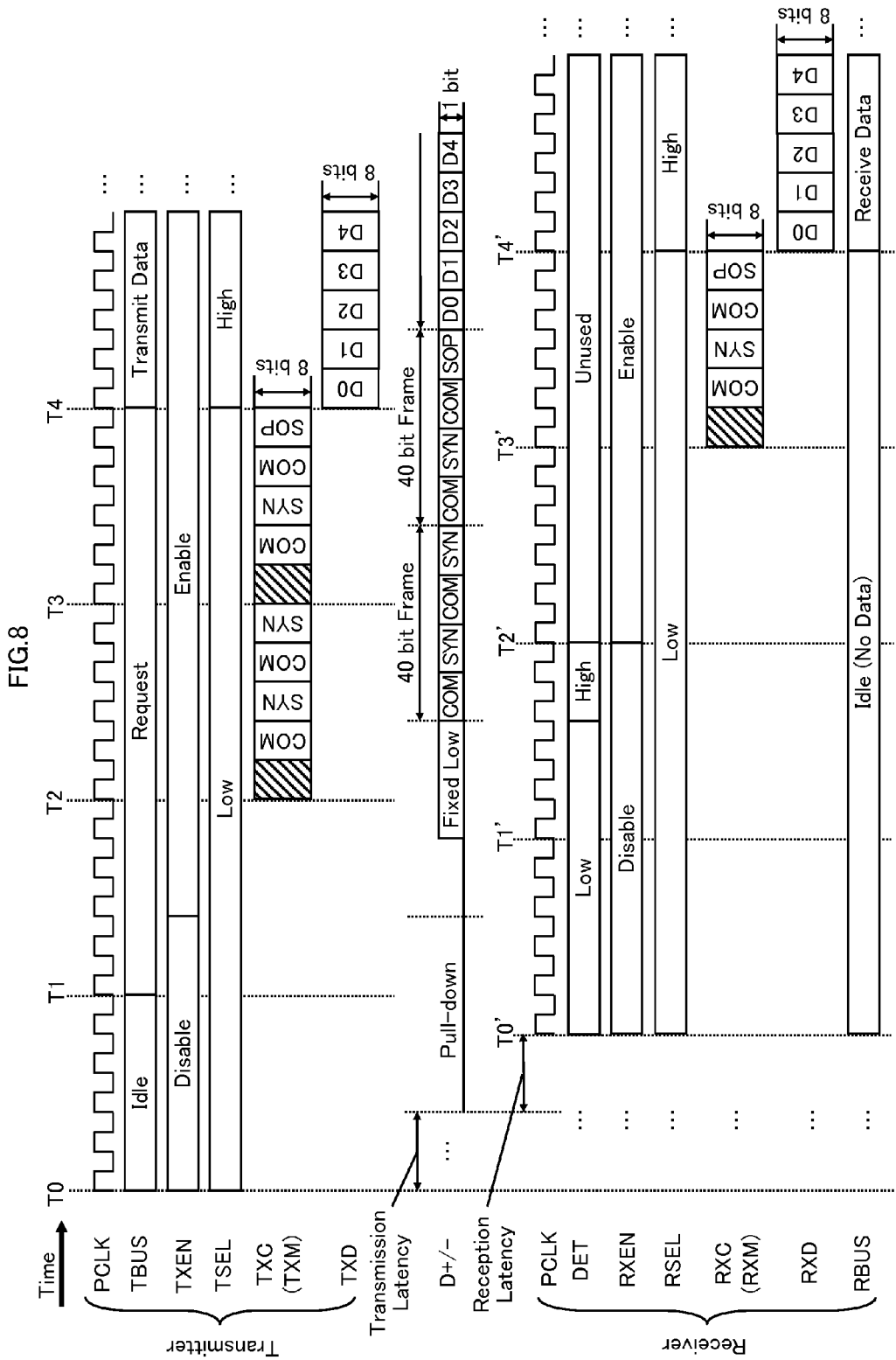
FIG. 8 is a timing diagram illustrating a restoration operation from a power-saving state of a communication system according to a first modification.

The following describes data transmission according to the first modification with use of a timing diagram illustrated in FIG. 8. In order to describe the structure, the functional block diagrams of FIGS. 1, 2, and 3 are also referred to. In the first modification, operation to be restored from the power-saving state and operation to transition to the power-saving state are described with use of FIGS. 8 and 9, respectively. A state not being the power-saving state is also referred to as a normal state.

<Restoration Operation from Power-Saving State of Transmitting Circuit>

[Time T0 to Time T1]

As illustrated in FIG. 8, for the transmitting circuit 103, a period between Time T0 and Time T1 is an idle period during which there is no transmission request via the transmission bus (TBUS). The transmission control unit 203 sets the enable signal (TXEN) for the serial driver 204 to Disable, so that the serial channel 121 is pulled down. This puts the serial driver 204 into the power-saving state.

[Time T1 to Time T2]

When there is the transmission request via the transmission bus (TBUS) at Time T1, the transmission control unit 203 sets the enable signal (TXEN) for the serial driver 204 to Enable to restore the serial driver 204 from the power-saving state. The transmission control unit 203 fixes an output from the serializer 205 to Low for a predetermined time period during restoration from the power-saving state, so that a Low fixed signal is output from the differential driver 206.

[Time T2 to Time T3]

After the Low fixed signal is output for the predetermined time period, the transmission control unit 203 starts transmission of a coding frame including the SYN by using the first encoding circuit 201. As shown in FIG. 6, the SYN has been generated by combining the COM symbol as a delimiter with a particular D symbol with a high edge-density of signals. The SYN is transmitted from the transmitting circuit 103 to the receiving circuit 113 for a predetermined time period to establish symbol synchronization at the restoration from the power-saving state.

[At and After Time T3]

The transmission control unit 203 starts transmission of the coding frame including the SOP at Time T3. Upon completion of the transmission of the coding frame, the transmission control unit 203 switches the transmission selection signal (TSEL) to High, and outputs transmission data transmitted via the transmission bus (TBUS) to the second encoding circuit 202 an eight-bit data character (TXD) at a time. Thereafter, the valid data is transmitted in the first modification as in the embodiment described above.

<Restoration Operation from Power-Saving State of Receiving Circuit>

[Time T0' to Time T1']

As illustrated in FIG. 8, in the idle period, the transmitting circuit 103 is in the power-saving state in which the serial channel 121 is pulled down, and the receiving circuit 113 is also in the power-saving state during the period between Time T0' and Time T1'. In a period during which the enable signal (RXEN) for the serial receiver 301 is set to Disable, the detection circuit 307 monitors differential amplitude on the serial channel 121. This means that the detection circuit 307 monitors an absolute value of a difference between the potentials on the signal lines D0+ and D0− constituting the serial channel 121. Since the serial channel 121 is pulled down during the period between Time T0' and Time T1', a detection signal (DET) output from the detection circuit 307 is Low, indicating that the differential amplitude is nearly zero. Upon receiving the detection signal (DET) being Low, the reception control unit 304 maintains the enable signal (RXEN) for the serial receiver 301 to Disable.

[Time T1' to Time T2']

When detecting the differential amplitude of the Low fixed signal output from the transmitting circuit 103 at some point in the period between Time T1' and Time T2', the detection circuit 307 switches the detection signal (DET) from Low to High. In response to this, the reception control unit 304 restores the serial receiver 301 from the power-saving state by setting the enable signal (RXEN) to Enable at Time T2'. When the differential receiver 305 is activated upon setting of the enable signal (RXEN) to Enable, the detection circuit 307 is no longer needed, and the detection signal (DET) as an output from the detection circuit 307 is no longer used. This means that the detection circuit 307 itself is operated, but is not referred to because the detection signal output from the detection circuit 307 is not needed until the detection signal serves as a trigger to restore the serial receiver 301 from the power-saving state next time.

[Time T2' to Time T3']

In the period between Time T2' and Time T3', the serial receiver 301 receives the coding frame including the SYN from the transmitting circuit 103. At this point, however, symbol synchronization is not yet established as the de-serializer 306 is just started being activated. The de-serializer 306 therefore cannot correctly receive signals as encoded symbols. To address this problem, the reception control unit 304 monitors signals input into the de-serializer 306, and detects a signal pattern in which the COM symbol cyclically appears for every two symbols to establish symbol synchronization.

[At and After Time T3']

When symbol synchronization is established at Time T3', the de-serializer 306 outputs correctly-separated 10-bit encoded symbols to the first decoding circuit 302. Thereafter, the receiving circuit 113 performs reception of data upon reception of the SOP as in the embodiment described above. That is to say, the receiving circuit 113 starts reception of the coding frame including the SOP at Time T3'. At after Time T4' at which the reception of the coding frame including the SOP is completed, the receiving circuit 113 switches the reception selection signal (RSEL) to High, and outputs, as the reception data, the data character (RXD) received from the second decoding circuit 303 via the transmission bus (RBUS).

<Transition Operation to Power-Saving State of Transmitting Circuit>

[Time T4 to Time T6]

Figure 9:
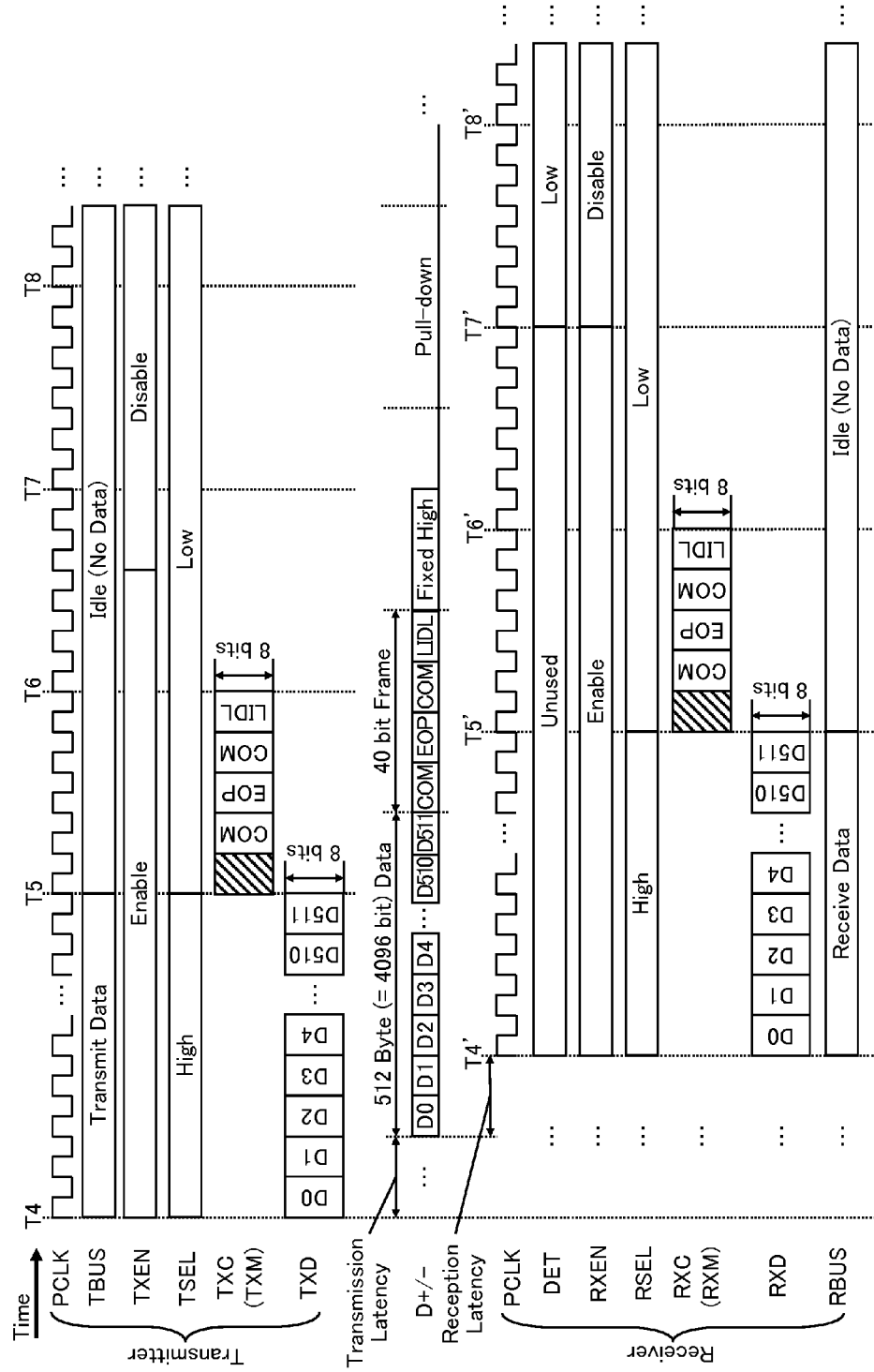
FIG. 9 is a timing diagram illustrating a transition operation to the power-saving state of the communication system according to the first modification.

As illustrated in FIG. 9, upon completion of transmission of the data character (TXD) of a predetermined packet size at Time T5, the transmission control unit 203 included in the transmitting circuit 103 switches the transmission selection signal (TSEL) to Low to select the first encoding circuit 201. The serial driver 204 then transmits the coding frame including the EOP.

[At and After Time T6]

After performing control so that the serial driver 204 outputs the High fixed signal for a predetermined time period at Time T6, the transmission control unit 203 sets the enable signal (TXEN) to Disable to cause the serial driver 204 to transition to the power-saving state. By doing so, the serial channel 121 is pulled down at and after T7.

<Transition Operation to Power-Saving State of Receiving Circuit 113>

[Time T4' to Time T6']

As illustrated in FIG. 9, upon completion of reception of the data character (TXD) of the predetermined packet size at Time T5', the reception control unit 304 included in the receiving circuit 113 switches the reception selection signal (RSEL) to Low to select the first decoding circuit 302. The serial receiver 301 then starts receiving the coding frame including the EOP.

[At and After Time T6']

At Time T6', the serial receiver 301 starts receiving the High fixed signal (Fixed High) output from the transmitting circuit 103. When the High fixed signal is input into the de-serializer 306, the reception control unit 304 starts transition to the power-saving state. Since the detection signal (DET) output from the detection circuit 307 is used as a trigger to restore the receiving circuit 113 from the power-saving state next time, the detection signal (DET) should certainly be set to Low before the transition to the power-saving state. The detection circuit 307 is a comparator that detects negative differential amplitude of the Low fixed signal as High. Therefore, by inputting positive differential amplitude of the High fixed signal, it is possible to make sure that the detection signal (DET) as an output from the detection circuit 307 becomes Low. In the first modification, when the detection signal (DET) becomes Low after the High fixed signal is received, the enable signal (RXEN) for the serial receiver 301 is set to Disable to cause the receiving circuit 113 to start transitioning to the power-saving state at Time T7'.

<Summary>

According to the first modification, the transmitting circuit 103 (115) and the receiving circuit 113 (105) corresponding thereto transition to the power-saving state in the idle period. At the time of restoration from the power-saving state, early establishment of symbol synchronization is achieved by using the COM symbol having a unique signal pattern in the 8B/10B coding to resume transmission of the valid data. Since it is possible to save power in the idle period, the first modification is especially effective in a case where valid data is not transmitted frequently.

<Second Modification>

The following describes a second modification of the embodiment according to the present invention with reference to the drawings. In the embodiment described above, the transmission data is scrambled an eight-bit data character at a time to generate eight-bit encoded blocks. The bit length of the data character, however, is not limited to eight bits. For example, suppose that the target device 110 illustrated in FIG. 1 is a display device, it is considered that pixel information with 10-bit precision of each of RGB colors is transmitted as the data character. In this case, the bit length of the encoded symbol generated by encoding the control character using the 8B/10B coding corresponds to the bit length of the encoded block generated using a second coding scheme for transmitting the valid data. In the second modification, description is made on a case where the bit length of the encoded symbol is equal to the bit length of the data character as described above.

<Structure>

Figure 10:
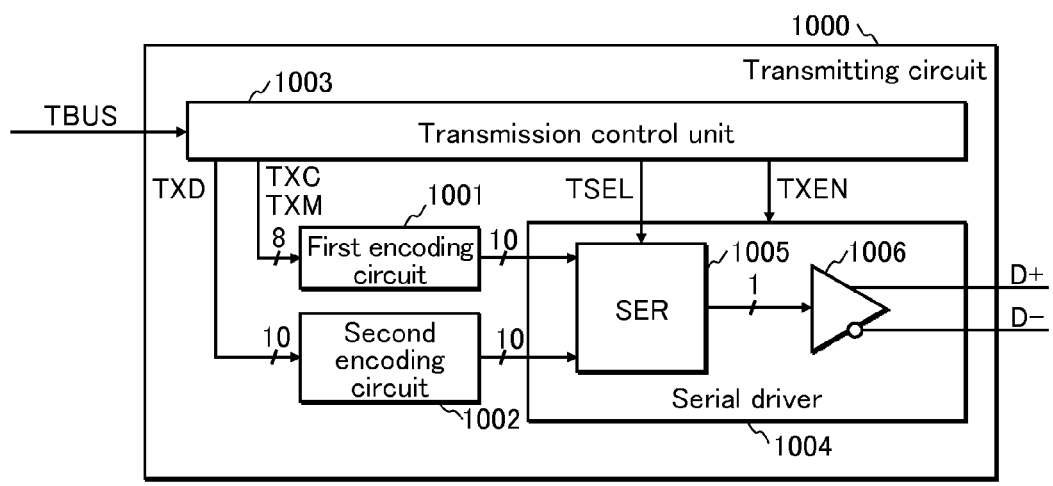
FIG. 10 is a block diagram illustrating an example of the detailed structure of a transmitting circuit in a communication system according to a second modification.

FIG. 10 is a block diagram illustrating the structure of the transmitting circuit according to the second modification. In the second modification, the host device 100 and the target device 110 each include a transmitting circuit 1000 illustrated in FIG. 10, in place of the transmitting circuits 103 and 115, respectively.

The transmitting circuit 1000 illustrated in FIG. 10 differs from the transmitting circuit 103 illustrated in FIG. 2 in that it includes a second encoding circuit 1002 in place of the second encoding circuit 202. The second encoding circuit 1002 illustrated in FIG. 10 differs from the second encoding circuit 202 shown in the embodiment described above in the following points. That is, the bit length of the data character (TXD) input into the second encoding circuit 1002 illustrated in FIG. 10 and the bit length of the output encoded symbol are each 10 bits, and the second encoding circuit 1002 scrambles 10-bit data at a time.

Encoding is performed by inputting the encoded symbol from the first encoding circuit 1001 to the serial driver 1004 or inputting the encoded block from the second encoding circuit 1002 to the serial driver 1004 by synchronization with the PCLK. Each of the encoded symbol and the encoded block is 10-bit parallel data. The serial driver 1004 therefore receives the 10-bit parallel data as input, and outputs serial data by synchronization with the SCLK, which has a frequency 10 times higher than that of the PCLK. With this structure, in a period during which the first encoding circuit 1001 is selected, the transmission control unit 1003 does not need to provide the standby time for each coding frame as shown in the embodiment described above.

Figure 11:
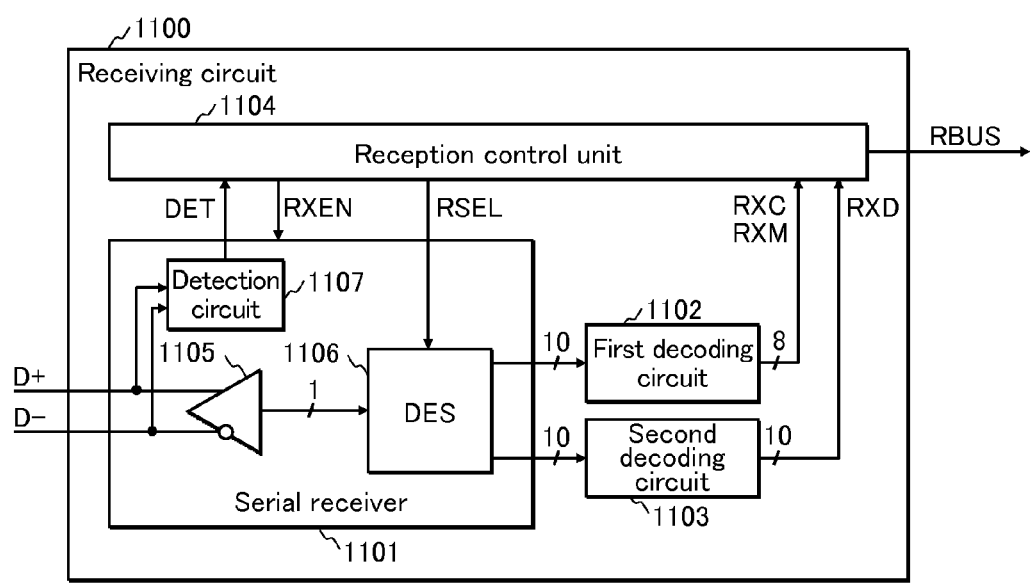
FIG. 11 is a block diagram illustrating an example of the detailed structure of a receiving circuit in the communication system according to the second modification.

Furthermore, a receiving circuit 1100 illustrated in FIG. 11 differs from the receiving circuit 113 illustrated in FIG. 3 in that it includes a second decoding circuit 1103 in place of the second decoding circuit 303. The second decoding circuit 1103 receives a 10-bit encoded block as input, decodes 10-bit data at a time, and outputs a 10-bit data character.

A serial receiver 1101 outputs the encoded symbol to the first decoding circuit 1102 or outputs the encoded block to the second decoding circuit 1103 by synchronization with the PCLK. Each of the encoded symbol and the encoded block output from the serial receiver 1101 is 10-bit parallel data. The serial receiver 1101 receives serial data as input by synchronization with the SCLK, which has a frequency 10 times higher than that of the PCLK, and outputs the serial data as the 10-bit parallel data by synchronization with the PCLK.

<Operation>

Figure 12:
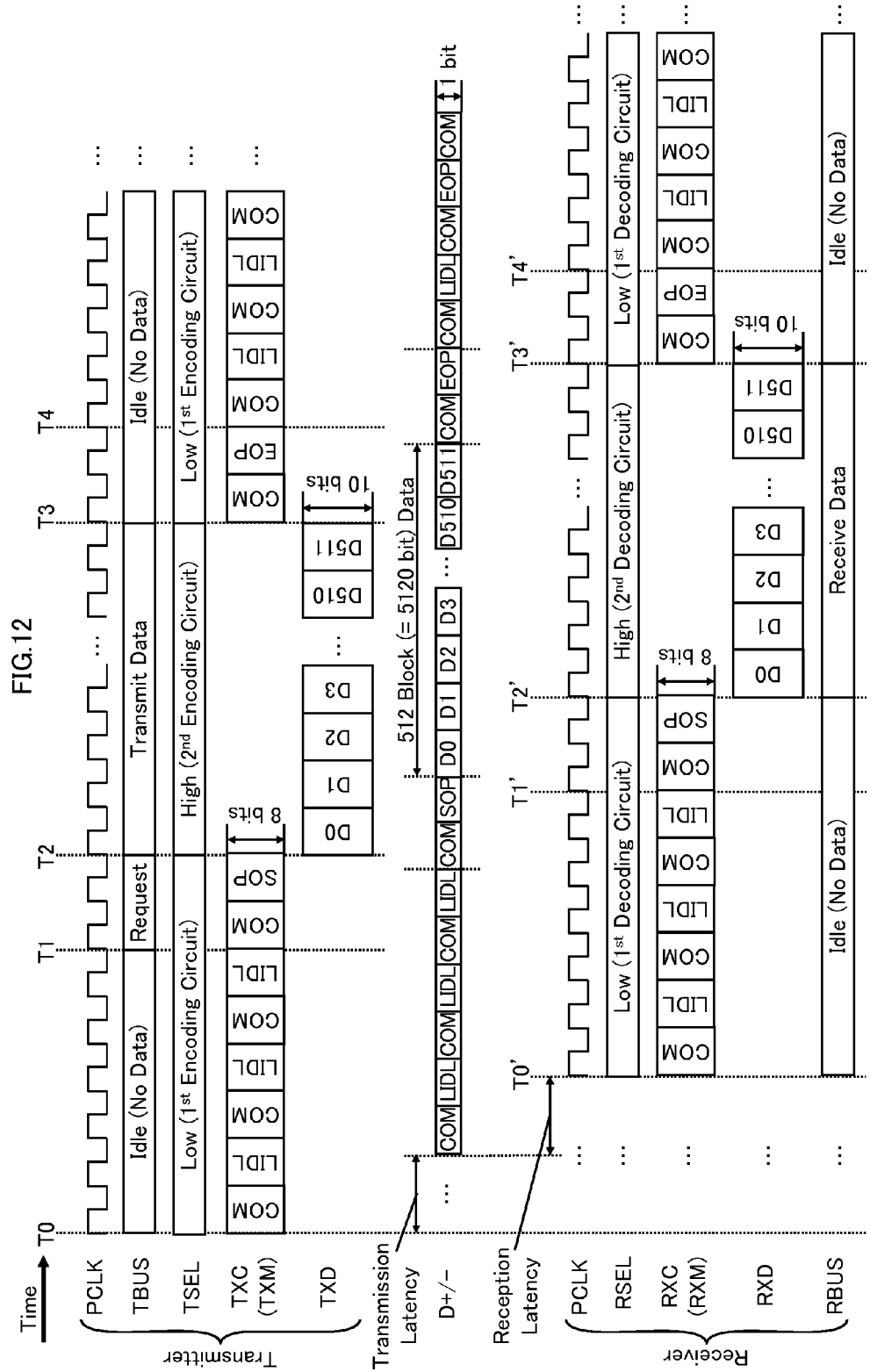
FIG. 12 is a timing diagram illustrating an example of an operation of the communication system according to the second modification.

The following describes operations of the transmitting circuit and the receiving circuit according to the second modification with use of a timing diagram illustrated in FIG. 12. FIG. 12 is the timing diagram illustrating data transmission from the transmitting circuit 1000 to the receiving circuit 1100 according to the second modification.

[Time T0 to Time T1]

As illustrated in FIG. 12, for the transmitting circuit 1000, a period between Time T0 and Time T1 is an idle period during which there is no transmission request via the transmission bus (TBUS). The transmitting circuit 1000 sets the transmission selection signal (TSEL) to Low to select the first encoding circuit 1001. The first encoding circuit 1001 repeatedly outputs the LIDL, which is the idle signal according to the 8B/10B coding. The serial driver 1004 converts the LIDL into serial data, and transmits the serial data to the receiving circuit 1100.

[Time T1 to Time T3]

Upon reception of a transmission request via the transmission bus (TBUS) at Time T1, the transmission control unit 1003 performs control so that the SOP indicating a start position of a packet is transmitted. As described above, in the second modification, there is no need to transmit the encoded symbol (or the symbol set) in units of coding frames, as there is no need to control the speed at which serial data is processed and the speed at which parallel data is processed. In the second modification, in response to the transmission request, the transmission control unit 1003 immediately performs control so that the SOP is transmitted, and switches the encoding circuit to the second encoding circuit 1002 at Time T2. At and after Time T2, the transmission control unit 1003 outputs transmission data transmitted via the transmission bus (TBUS) to the second encoding circuit 1002 a 10-bit data character (TXD) at a time. The second encoding circuit 1002 randomizes a bit pattern of the 10-bit data character by scrambling to generate a 10-bit encoded block, and outputs the 10-bit encoded block to the serial driver 1004. The serial driver 1004 converts the encoded block input thereto into serial data, and outputs the serial data via the serial channel 121.

[At and After Time T3]

Upon completion of transmission of the data character (TXD) of a predetermined packet size at Time T3, the transmission control unit 1003 switches the transmission selection signal (TSEL) to Low to select the first encoding circuit 1001. The transmission control unit 1003 performs control so that the coding frame including the EOP indicating an end position of a packet is transmitted. At and after Time T4, the transmission control unit 1003 performs control so that the encoded symbol LIDL indicating the idle period is repeatedly transmitted as in the period between Time T0 and Time T1.

When a size of transmission data transmitted via the transmission bus (TBUS) exceeds the predetermined packet size, the transmission request via the transmission bus (TBUS)

continues at Time T3. As a result, the transmitting circuit 1000 once switches from the second encoding circuit 1002 to the first encoding circuit 1001, and transmits the coding frame including the SOP as in the period between Time T1 and Time T2. The transmitting circuit 1000 then switches the encoding circuit to the second encoding circuit 1002 again, and the second encoding circuit 1002 encodes residual transmission data a 10-bit data character (TXD) at a time. The transmitting circuit 1000 continuously outputs encoded blocks generated as a result of encoding from the serial driver 1004.

<Operation of Receiving Circuit>

[Time T0' to Time T1']

The reception control unit 1104 included in the receiving circuit 1100 selects the first decoding circuit 1102 at Time T0' by setting the reception selection signal (RSEL) to Low, as it is the idle period before data reception. The reception control unit 1104 confirms that the idle period is continued by repeatedly receiving the LIDL at and after Time T0'.

[Time T1' to Time T3']

In the period between Time T1' and Time T2', the reception control unit 1104 performs reception of the SOP. Triggered by the reception of the SOP at Time T2' at which the reception is completed, the reception control unit 1104 switches the reception selection signal (RSEL) to High. In response to the switching of the reception selection signal (RSEL) to High, the serial receiver 1101 receives the serial data via the serial channel 121 a 10-bit encoded block at a time. The serial receiver 1101 then outputs the received 10-bit serial data to the second decoding circuit 1103 as 10-bit parallel data by synchronization with the PCLK. The second decoding circuit 1103 descrambles the encoded block input thereto into the data character (RXD), and inputs the data character to the reception control unit 1104. The reception control unit 1104 outputs, as reception data, the received data character (RXD) to the back-end unit via the reception bus (RBUS).

[At and After Time T3']

Upon completion of reception of the data character (RXD) of a predetermined packet size at Time T3', the reception control unit 1104 switches the reception selection signal (RSEL) to Low to select the first decoding circuit 1102, and performs reception of the EOP. Upon completion of the reception of the EOP at Time T4', the reception control unit 1104 continues reception of the LIDL as in the period between Time T0' and Time T1'. When data transmission from the transmitting circuit 1000 continues at and after Time T3', the reception control unit 1104 performs data reception as in the period between Time T2' and Time T3' by receiving the SOP again.

<Summary>

According to the second modification, the transmitting circuit 1000 and the receiving circuit 1100 corresponding thereto can switch between the first channel coding and the second channel coding with a simple structure without controlling the standby time for each coding frame. In particular, because parallel data pieces handled by synchronization with the PCLK by the serial drivers 1004 and 1101 have the same bit length (i.e. 10 bits), the structure can be simplified compared to the structure in which eight-bit data and 10-bit data are both used.

In the communication system according to the second modification, even when the bit length of each of the data characters handled by the transmission bus (TBUS) and the reception bus (RBUS) is eight bits, the data characters are transmitted a 10-bit encoded block at a time on the serial channel 121. With this structure, the above-mentioned advantageous effect that the structure is simplified is obtained.

In this case, the transmission control unit 1003 is required to convert a sequence of eight-bit data characters input via the transmission bus (TBUS) into 10-bit data characters (TXDs) and output the 10-bit data characters to the second encoding circuit 1002. When a packet size of the transmission data is not a multiple of 10 bits, appropriate padding data may be added to an end of the packet so that the packet size becomes a multiple of 10 bits. The transmission control unit 1003 may have the function to add the padding data.

The reception control unit 1104 performs control so that the received 10-bit data characters (RXDs) are converted into reception data eight bits at a time, and the eight-bit reception data is output via the reception bus (RBUS). In this case, before the output of the reception data, it is necessary to remove the padding data having been added to the end of the packet in accordance with a packet size shared in advance. The reception control unit 1104 may have the function to remove the padding data.

<Third Modification>

The following describes a third modification of the embodiment according to the present invention with reference to the drawings. In the embodiment described above, the transmission data is scrambled by the second encoding circuit and transmitted as the serial data. The run-length at the time of transmitting the serial data, however, is not ensured. Therefore, in the embodiment described above, values "0" or "1" may continue for a long time period, depending on the transmission data.

To address this problem, in the third modification, description is made on a case where a scheme in which a predetermined number of consecutive data characters are scrambled, and a synchronization header is added to the predetermined number of data characters to generate the encoded block is applied as the second channel coding. Specifically, description is made on the assumption that the 64B/66B coding is used as the second channel coding. In the 64B/66B coding, eight data characters of consecutive eight bits are scrambled into a 64-bit data character, and a 2-bit synchronization header is added to the 64-bit data character to generate a 66-bit encoded block. In this case, for the purpose of ensuring the run-length, only "01" and "10", each of which includes a bit transition from 0 to 1 or from 1 to 0, are used as the synchronization header. As for the synchronization header, "01" is used as a non-terminating synchronization header (NTSYNC). On the other hand, "10" is used as a terminating synchronization header (TSYNC). A termination identifying signal (TERM) is used to identify a non-terminating block (NTBLK), which is an encoded block including the non-terminating synchronization header (NTSYNC), and a terminating block (TBLK), which is an encoded block including the terminating synchronization header (TSYNC).

<Structure>

Figure 13:
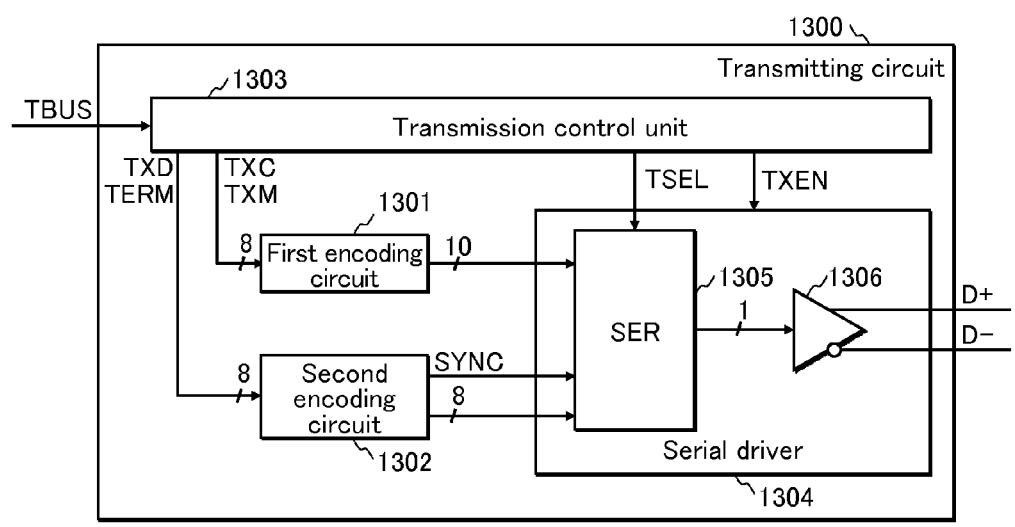
FIG. 13 is a block diagram illustrating an example of the detailed structure of a transmitting circuit in a communication system according to a third modification.

FIG. 13 is a block diagram illustrating the structure of a transmitting circuit 1300 according to the third modification. In the transmitting circuit 1300 illustrated in FIG. 13, a second encoding circuit 1302 receives the termination identifying signal (TERM) from a transmission control unit 1303. The transmitting circuit 1300 differs from the transmitting circuit 103 according to the embodiment described above in that, upon reception of the termination identifying signal (TERM), one of the non-terminating synchronization header (NTSYNC) and the terminating synchronization header (TSYNC) is output as the synchronization header.

The termination identifying signal (TERM) is used to cause the receiving circuit to identify whether the encoded block output from the transmission control unit 1303 is the non-terminating block (NTBLK) or the terminating block (TBLK).

The second encoding circuit 1302 scrambles eight data characters (TXDs), and outputs the eight scrambled data characters to the serial driver 1304 in a cycle time of eight cycles of the PCLK. In this case, the second encoding circuit 1302 also outputs the two-bit synchronization header (SYNC) in the first cycle of the eight cycles. The second encoding circuit 1302 thus outputs a 66-bit encoded block including the synchronization header in the cycle time of eight cycles of the PCLK.

The serial driver 1304 outputs the encoded block via the serial channel 121 as the serial data in a cycle time of 66 cycles of the SCLK. In the third modification, the frequency ratio of the PCLK to the SCLK is 8:66, so that a speed at which the transmission data is input matches a speed at which the serial data is output. This means that the amount of input data corresponds to the amount of output data per unit time.

Figure 14:
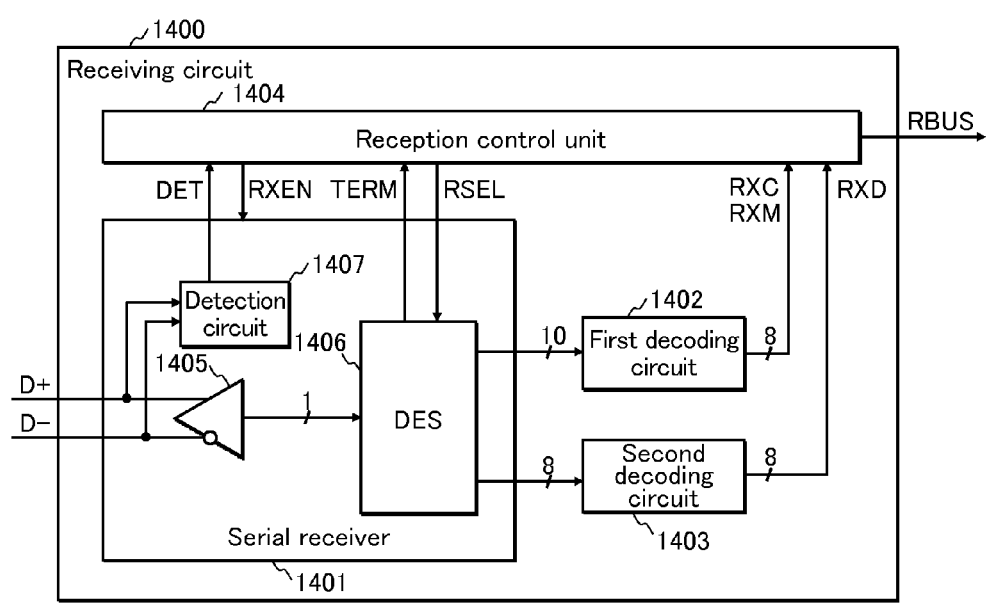
FIG. 14 is a block diagram illustrating an example of the detailed structure of a receiving circuit in the communication system according to the third modification.

FIG. 14 illustrates the structure of a receiving circuit 1400 according to the third modification. The receiving circuit 1400 has approximately the same structure as the receiving circuit 113 in the embodiment described above. The receiving circuit 1400, however, differs from the receiving circuit 113 in that the termination identifying signal (TERM) is output from the serial driver 1401 to the reception control unit 1404. The reception control unit 1404 is capable of detecting an end of the reception data by using the termination identifying signal (TERM). Therefore, in contrast to the embodiment described above, there is no need to share a packet size between a transmitter and a receiver.

The serial receiver 1401 outputs serial data received via the serial channel 121 by synchronization with the SCLK to the first decoding circuit 1402 as 10-bit encoded symbols by synchronization with the PCLK. Similarly to the transmitting circuit 1300, the frequency ratio of the PCLK to the SCLK is 8:66 in the receiving circuit 1400. As a result, each of the 10-bit encoded symbols cannot be received in a cycle time of one cycle of the PCLK. The serial receiver 1401 thus receives a coding frame including 33 encoded symbols for every 40 cycles of the PCLK.

On the other hand, in a period during which the reception control unit 1404 selects the second decoding circuit 1403 by setting the reception selection signal (RSEL) to High, the serial receiver 1401 receives a 66-bit encoded block in a cycle time of eight cycles of the PCLK. Eight eight-bit data characters generated as a result of the scrambling, which are valid data within the encoded block, are continuously output to the second decoding circuit 1403 in a cycle time of eight cycles of the PCLK. When outputting the eight eight-bit data characters, the serial receiver removes the synchronization header.

Since the other functional structures of the transmitting circuit 1300 and the receiving circuit 1400 are similar to those in the embodiment described above, detailed description thereon is omitted.

<Data>

The following describes the structure of the coding frame in the third modification. Similarly to the embodiment described above, the bit length of the encoded symbol (10) differs from the bit length of the encoded block (66) in the third modification.

In the third modification, the bit length of the coding frame is set to 330 bits, which is equal to the least common multiple of bit length of the encoded symbol (10) and the bit length of the encoded block (66). When the first encoding circuit 1301 is selected, the encoded symbols are transmitted in units of 330-bit coding frames.

FIGS. 15A to 15D each illustrate the structure of the coding frame in the third modification.

Figure 15A:
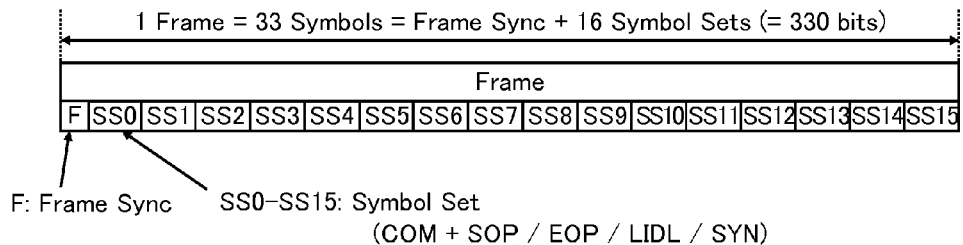
FIGS. 15A to 15D each illustrate an example of the structure of a coding frame used by the communication system according to the third modification.

The following describes the basic structure of the coding frame according to the third modification, with use of FIG. 15A. As illustrated in FIG. 15A, the coding frame includes a frame synchronization symbol (F: Frame Sync) and 16 symbol sets (SS0 to SS15: Symbol Sets). The frame synchronization symbol (F) is the COM symbol (K28.5) added to the beginning of the coding frame. As in the embodiment described above, each of 16 symbol sets has been generated by combining the COM symbol (K28.5) with a symbol other than the COM symbol. Since, in each coding frame, the first symbol set (SS0) following the frame synchronization symbol (F) is immediately followed by the COM, a receiver can recognize a boundary between coding frames.

Figure 15B:
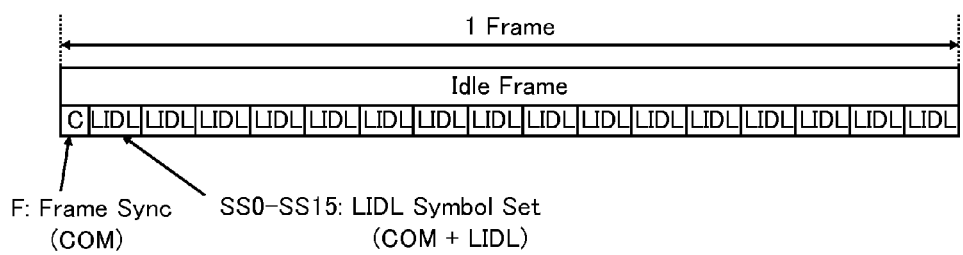

FIG. 15B illustrates one example of the structure of the coding frame (an idle frame) for notifying the receiving circuit 1400 of the idle period in the third modification. As illustrated in FIG. 15B, the idle frame includes the frame synchronization symbol (C) including the COM symbol, and 16 LIDLs.

Figure 15C:
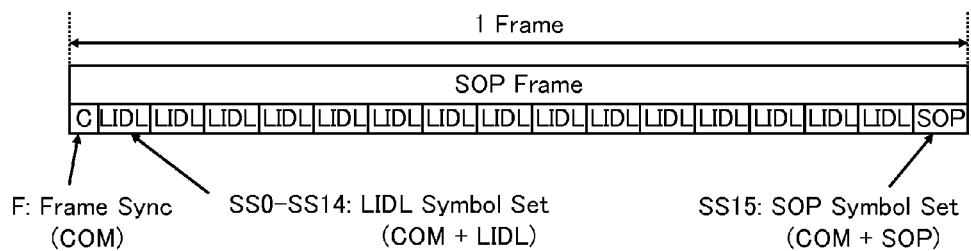
Figure 15D:
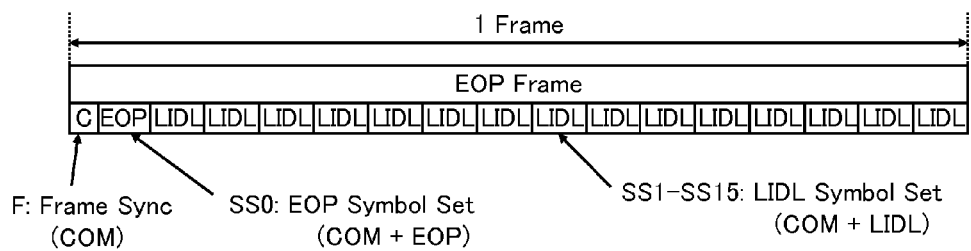

FIG. 15C illustrates one example of the structure of the SOP frame used for notification of a start position of a packet, and FIG. 15D illustrates one example of the structure of the EOP frame used for notification of an end position of a packet.

As illustrated in FIG. 15C, in the SOP frame, each of the symbol sets SS0 to SS14 is the LIDL, and the symbol set SS15 is the SOP. As illustrated in FIG. 15D, in the EOP frame, the symbol set SS0 is the EOP, and each of the symbol sets SS1 to SS15 is the LIDL.

<Operation>

Figure 16:
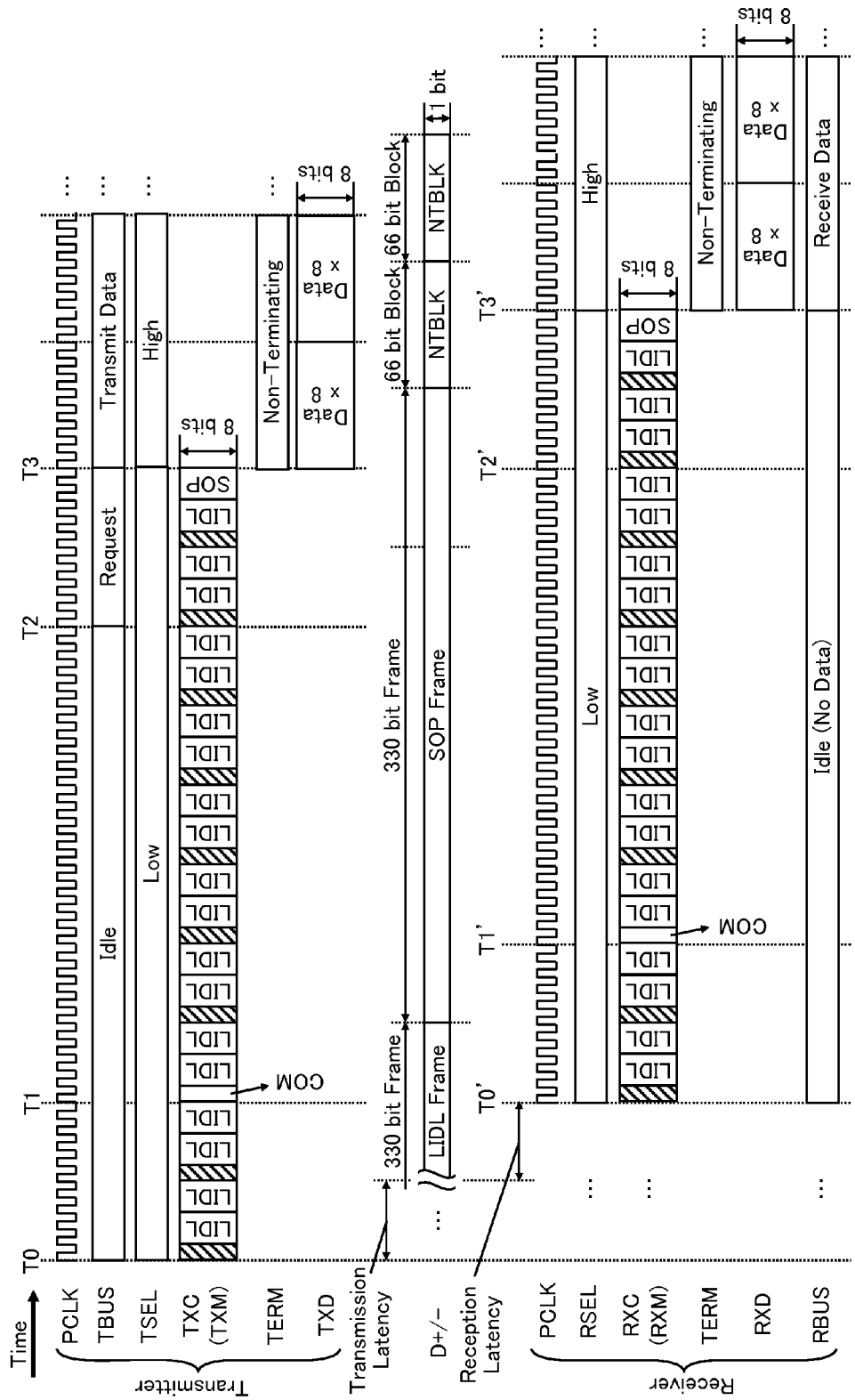
FIG. 16 is a timing diagram illustrating an example of an operation before the start of data transmission of the communication system according to the third modification.

The following describes an operation of the communication system according to the third modification with use of a timing diagram illustrated in FIG. 16. FIG. 16 is a timing diagram illustrating an operation before the start of data transmission of the communication system according to the third modification. In order to describe the structure, the system diagram of FIG. 1 and the block diagrams of FIGS. 13 and 14 are also referred to.

<Operation before Start of Data Transmission of Transmitting Circuit>

[Time T0 to Time T1]

As illustrated in FIG. 16, since the period between Time T0 and Time T1 is the idle period during which there is no transmission request via the transmission bus (TBUS), the transmission control unit 1303 selects the first encoding circuit 1301 by setting the transmission selection signal (TSEL) to Low. The transmitting circuit 1300 thus transmits the idle frame illustrated in FIG. 15B to the receiving circuit 1400.

[Time T1 to Time T3]

The transmission control unit 1303 starts transmission of the next coding frame at Time T1. The transmission control unit 1303 outputs four control characters (TXCs) for every five cycles of the PCLK, and provides the standby time in the first cycle. The transmission control unit 1303 performs control so that the control character (TXC) corresponding to the frame synchronization symbol, i.e. the COM symbol (K28.5), is output only in the standby time, such as Time T1, at the beginning of the coding frame. With this structure, the transmission control unit 1303 can perform control so that 33 control characters (TXCs) corresponding to a coding frame is output in a cycle time of 40 cycles of the PCLK, i.e. in a period between Time T1 and Time T3.

Upon reception of the transmission request via the transmission bus (TBUS) at Time T2, the transmission control unit 1303 performs control so that the last symbol set (SS15) within the coding frame is the SOP. The transmission control unit 1303 performs control so that the SOP frame illustrated in FIG. 15C is output in the period between Time T1 and Time T3. The transmission control unit 1303 then switches the transmission selection signal (TSEL) to High at Time T3 so that transmission data transmitted via the transmission bus (TBUS) is output to the second encoding circuit 1302 an eight-bit data character (TXD) at a time.

[At and After Time T3]

At and after Time T3, the transmission control unit 1303 sets the termination identifying signal (TERM) to Non-Terminating, and performs control so that eight data characters (TXDs) are output at a time to the second encoding circuit 1302. The second encoding circuit 1302 scrambles the output eight data characters (TXDs), and adds the non-terminating synchronization header (NTSYNC) to the scrambled eight data characters to generate the non-terminating block (NTBLK). The serial driver 1304 converts the non-terminating block (NTBLK) into the serial data, and outputs the serial data to the serial channel 121.

<Operation before Start of Data Transmission of Receiving Circuit 1400>

[Time T0' to Time T1']

As illustrated in FIG. 16, the reception control unit 1404 sets the reception selection signal (RSEL) to Low at Time T0' to select the first decoding circuit 1402 in the idle period before reception of data, so that the idle frame as illustrated in FIG. 15B is received.

[Time T1' to Time T3']

The reception control unit 1404 starts reception of the next coding frame at Time T1'. The serial receiver 1401 outputs four encoded symbols to the second decoding circuit 1403 for every five cycles of the PCLK, and provides the standby time in the first cycle. The reception control unit 1404 performs control so that the COM as the frame synchronization symbol is received only in the standby time, such as Time T1', at the beginning of the coding frame.

The reception control unit 1404 can perform control so that 33 control characters (RXCs) corresponding to a coding frame are received in a cycle time of 40 cycles of the PCLK, i.e. in a period between Time T1' and Time T3'. Upon completion of reception of the SOP frame as illustrated in FIG. 15C at Time T3', the reception control unit 1404 switches the reception selection signal (RSEL) to High.

[At and After Time T3']

The serial receiver 1401 receives, as input, a 66-bit encoded block, at a time, of the serial data via the serial channel 121 at and after Time T3'. The serial receiver 1401 consecutively outputs 64-bit valid data, which has been generated by removing the synchronization header (SYNC) from the encoded block input thereto, to the second decoding circuit 1403 in a cycle time of eight cycles of the PCLK. The reception control unit 1404 outputs, as the reception data, the data character (RXD) generated as a result of descrambling by the second decoding circuit 1403 via the reception bus (RBUS).

Figure 17:
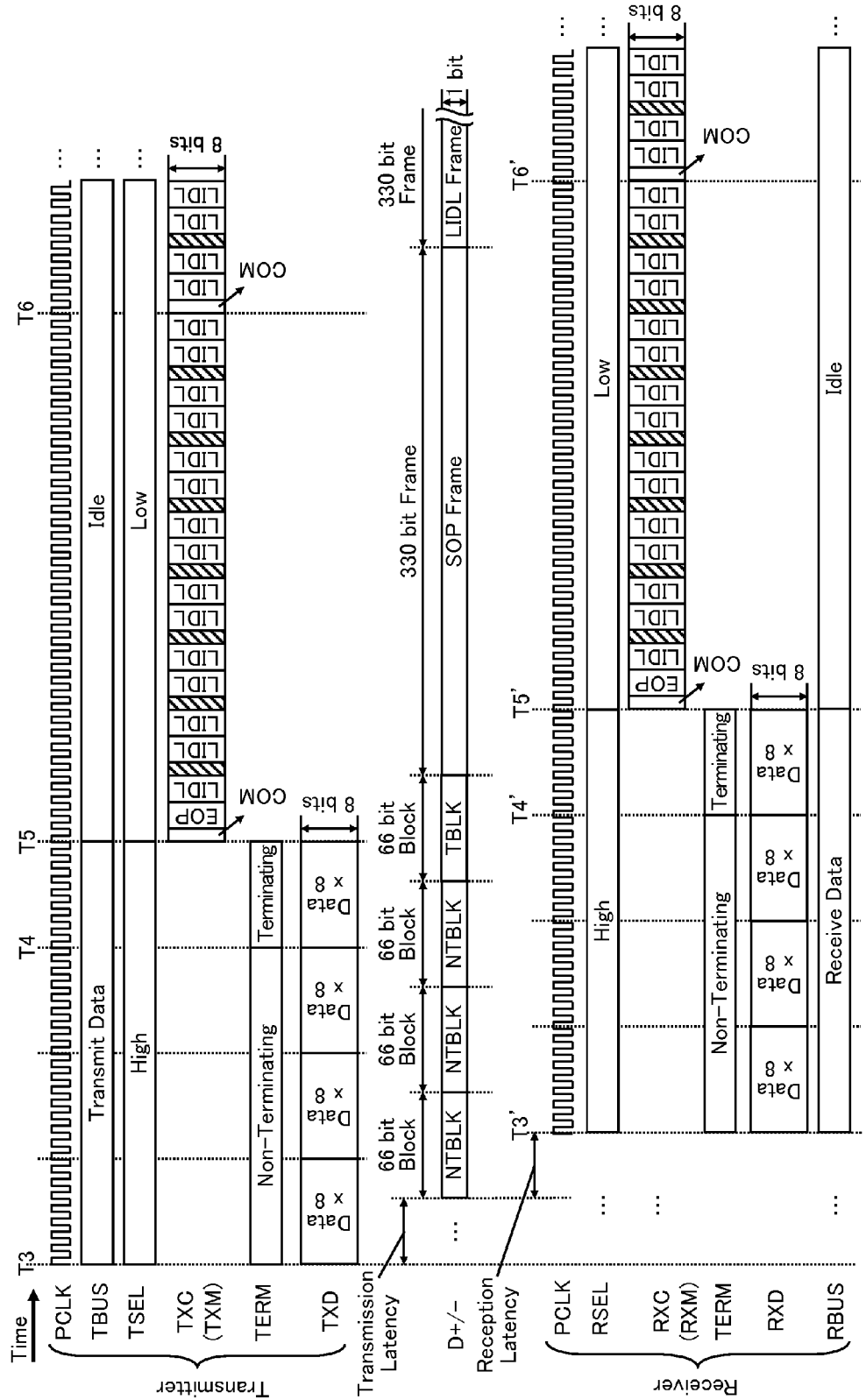
FIG. 17 is a timing diagram illustrating an example of a transition operation to an idle period of the communication system according to the third modification.

The following describes a transition operation to the idle period of the transmitting circuit 1300 and the receiving circuit 1400 in the third modification. FIG. 17 is a timing diagram illustrating the transition operation.

<Transition Operation to Idle Period of Transmitting Circuit>

[Time T3 to Time T5]

As illustrated in FIG. 17, at and after Time T3, the transmission control unit 1303 sets the termination identifying signal (TERM) to Non-Terminating, and performs control so that transmission of the non-terminating block (NTBLK) is continued. At Time T4, the transmission control unit 1304 switches the termination identifying signal (TERM) to Terminating, and performs control so that the terminating block (TBLK) is transmitted as the last encoded block of the transmission data.

[At and After Time T5]

Upon completion of the transmission of the terminating block (TBLK) at Time T5, the transmitting circuit 1300 switches the transmission selection signal (TSEL) to Low to select the first encoding circuit 1301. Thereafter, the transmitting circuit 1300 transmits the EOP frame as illustrated in FIG. 15D. Upon completion of the transmission of the EOP frame at Time T6, the transmitting circuit 1300 repeatedly transmits the idle frame as illustrated in FIG. 15B and transitions to the idle period.

<Transition Operation to Idle Period of Receiving Circuit>

[Time T3' to Time T5']

As illustrated in FIG. 17, since reception of the non-terminating block (NTBLK) is continued at and after Time T3', the reception control unit 1404 sets the termination identifying signal (TERM) to Non-Terminating. Upon reception of the terminating block (TBLK) at Time T4', the reception control unit 1404 switches the termination identifying signal (TERM) to Terminating, and detects an end of reception data.

[At and After Time T5']

When the reception of the terminating block (TBLK) is completed at Time T5', the reception control unit 1404 switches the reception selection signal (RSEL) to Low to select the first decoding circuit, and then performs control so that the EOP frame as illustrated in FIG. 15D is received. The reception control unit 1404 performs control so that the idle frame as illustrated in FIG. 15D is repeatedly received at and after Time T6' at which the reception of the EOP frame is completed, so that the receiving circuit 1400 transitions to the idle period.

<Summary>

In the third modification, by adding the synchronization header (SYNC) "10" or "01", each encoded block includes a bit transition from 0 to 1 or from 1 to 0 at least one time. It is therefore possible to limit the run-length of the transmission data. Furthermore, in the third modification, by using the non-terminating synchronization header (NTSYNC) or the terminating synchronization header (TSYNC) as the synchronization header (SYNC), a timing at which the data transmission is completed is shared between the transmitting circuit 1300 and the receiving circuit 1400. With this structure, it becomes unnecessary to share a packet size in advance in the third modification.

<Supplemental Note 1>

While the embodiment of the transmitting circuit, the receiving circuit, and the communication system including the transmitting circuit and the receiving circuit according to the present invention has been described above, the above-exemplified communication system may be modified as described below. The present invention is in no way limited to the communication system as described in the above-mentioned embodiment.

(1) In the embodiment described above, the 8B/10B coding is taken as an example of the first channel coding. The first channel coding, however, is not limited to the 8B/10B coding, and may be any scheme as long as it is symbol mapping in which m-bit data is mapped to n-bit data. In addition, the first channel coding may be any scheme as long as it is a coding scheme that can achieve early establishment of synchronization. Similarly, the 64B/66B coding is taken as an example of the second channel coding. The second channel coding, however, is not limited to the 64B/66B coding, and may be any scheme as long as it is a scheme having less coding loss than the first channel coding even though establishment of synchronization is slower than the first channel coding.

(2) In the embodiment described above, the scrambler and the descrambler are respectively described as the self-synchronizing scrambler and the self-synchronizing descrambler. The scrambler and the descrambler, however, may not be the self-synchronizing scrambler and the self-synchronizing descrambler, respectively. That is to say, the scrambler and the descrambler each may set each of the shift registers (S0 to S39 and D0 to D39) included in the respective circuits to have a predetermined default value according to a timing at which the transmitting circuit switches the encoding circuit to the second encoding circuit 202 and the receiving circuit switches the decoding circuit to the second decoding circuit 303.

As for the setting of the default value, in the transmitter, the second encoding circuit 202 may hold in advance a default value to be stored in each of the shift registers included in the scrambler and set each of the shift registers to have the default value according to the timing described above. Alternatively, the transmission control unit 203 may provide the setting.

Similarly, in the receiver, the second decoding circuit 303 may hold in advance a default value to be stored in each of the shift registers included in the descrambler and set each of the shift registers to have the default value according to the timing described above. Alternatively, the reception control unit 304 may provide the setting.

(3) In the embodiment described above, the detection circuit included in the receiving circuit detects the Low fixed signal and the High fixed signal from differential amplitude based on potentials on both signal lines constituting a serial channel. The detection circuit may detect the Low fixed signal and the High fixed signal in another way.

For example, the detection circuit may detect a potential on only one of the signal lines constituting the serial channel. The transmitter outputs the Low fixed signal, which is a signal whose potential is fixed to Low, and the High fixed signal, which is a signal whose potential is fixed to High. Note that the detection circuit is configured to distinguish the control character from the Low fixed signal and the High fixed signal. To this end, the transmitter is configured to output the Low fixed signal and the High fixed signal for a longer time than continuously-output control characters having the same value. For example, in the 8B/10B coding, the same value is never continuously output for six or more clocks. The transmitter can cause the receiver to recognize the Low fixed signal and the High fixed signal by outputting the Low fixed signal and the High fixed signal for six or more clocks. The present invention may have the above-mentioned structure so that the Low fixed signal and the High fixed signal are detected.

(4) The generating polynomial indicated in the embodiment described above is just one example. Another generating polynomial may be used as long as the same generating polynomial is shared between the transmitter and the receiver.

(5) In the third modification described above, the frame synchronization symbol (F) included in the coding frame is not limited to the COM symbol (K28.5). The frame synchronization symbol (F) included in the coding frame may be any symbol as long as it defines a boundary between coding frames shared between the transmitter and the receiver. The frame synchronization symbol (F) may be at any position as long as it is at a predetermined position. The position of the frame synchronization symbol (F) is not limited to the beginning of the coding frame. For example, the frame synchronization symbol (F) can define a boundary between coding frames as shown in the modification described above by adding the same symbol as the second symbol included in the last symbol set (SS15) to the end of the coding frame. The frame synchronization symbol (F) may be inserted into the coding frame. Specifically, the frame synchronization symbol (F) may define a boundary between coding frames by sharing, between the transmitter and the receiver, symbol sets between which the frame synchronization symbol (F) is inserted.

(6) In the third modification described above, symbol sets included in the SOP frame illustrated in FIG. 15C and symbol sets included in the EOP frame illustrated in FIG. 15D are not limited to the LIDLs. Another symbol set may be used in place of the LIDL. For example, in place of the LIDLs, the SOPs may further be included in the SOP frame so as to address such a problem that the receiver cannot accurately receive the last SOP (SS15) due to a communication error or other causes. Similarly, in place of the LIDLs, the EOPs may further be included in the EOP frame so as to address such a problem that the receiver cannot accurately receive the last EOP (SS0) due to a communication error or other causes.

Alternatively, with the structure in which the system transitions to the power-saving state as shown in the second modification, the SOP frame may include the SYNCs described in the second modification in place of all the LIDLs. With the above-mentioned structure, establishment of symbol synchronization and notification of a start position of a packet can be achieved by only one SOP frame.

The last symbol set (SS15) of the EOP frame may be the SOP so that continuous data transmission is achieved. That is to say, one coding frame may be provided with the function as the EOP and the function as the SOP.

(7) In the embodiment described above, in the communication system illustrated in FIG. 1, a clock channel may be provided between the host device 100 and the target device 110 so that a reference clock for generating various clocks may be shared between the PLL 108 and the PLL 113.

(8) In the embodiment described above, the serial data is transmitted via the serial channel in differential signaling. The method for transmitting the serial data via the serial channel may not be limited to the differential signaling, and may be another method such as a single-ended signaling.

(9) Specific examples of the back-end unit included in the target device in the embodiment described above are as follows. For example, in a case where the target device is a semiconductor memory card, nonvolatile memory and a controller therefor fall under the back-end unit. In this case, a drive for a nonvolatile memory card installed in a PC falls under the host device 100. In a case where the target device is a communication device, a communication module including an RF (Radio Frequency) transceiver, a baseband circuit, and an MAC (Media Access Control) circuit and the like fall under the back-end unit. Suppose that the target device 110 performs simplex high-speed transmission with the host device 100, as exemplified by a display device and a camera device. In this case, depending on a transmission direction, the interface circuit included in each of the host device 100 and the target device 110 may include only one of the transmitting circuit and the receiving circuit.

(10) Each of the transmitting circuit and the receiving circuit described in the above embodiment may be implemented as a circuit for performing the function described above, or may be implemented by one or more processors executing a program. The communication system described in the embodiment may be configured as a package of an IC, LSI, and other integrated circuits. The package is provided for use by being incorporated into various devices. With this structure, the various devices can achieve functions described in the embodiment and modifications.

(11) A control program including a program code for causing a processor such as the host device and the target device, and various circuits connected to the processor to perform operations pertaining to the communications, processing to switch between encoding circuits and processing to switch between decoding circuits described in the above embodiment may be recorded on a recording medium, or may be circulated or distributed via various communication channels. Examples of the recording medium are an IC card, a hard disk, an optical disc, a flexible disk, ROM, and flash memory. The control program thus circulated or distributed is provided for use by being stored in memory and the like readable to a processor. By the processor executing the control program, various functions described in the embodiment are achieved.

<Supplemental Note 2>

The following describes the structures, the modifications, and the effects of the transmitting circuit, the receiving circuit, and the communication system as one embodiment of the present invention.

(1) The first transmitting circuit according to the present invention is a transmitting circuit that performs channel coding and transmits channel-coded serial data to a receiving circuit via a serial channel, comprising: a first encoding circuit configured to perform first channel coding in which an m-bit control character is mapped to an n-bit (m<n) encoded symbol; a second encoding circuit configured to perform second channel coding in which a bit pattern of a data character is randomized by scrambling to generate an encoded block, the second channel coding taking more time in establishing synchronization with the receiving circuit and having less coding loss than the first channel coding; a transmission control unit configured to select one of the first encoding circuit and the second encoding circuit to be used for transmission; and a serial driver configured to, when the transmission control unit selects the first encoding circuit, convert the encoded symbol generated by the first encoding circuit into serial data and transmit the serial data via the serial channel, and to, when the transmission control unit selects the second encoding circuit, convert the encoded block generated by the second encoding circuit into serial data and transmit the serial data via the serial channel, wherein the transmission control unit selects the first encoding circuit in a period for not transmitting the data character, and selects the second encoding circuit in a period for transmitting the data character.

With this structure, in an idle period not influencing the transmission efficiency, the transmitting circuit can select the first encoding circuit configured to perform channel coding having large coding loss but achieving early establishment of synchronization. In a period for transmitting the encoded block generated based on the data character, i.e. a packet payload, the transmitting circuit can select the second encoding circuit configured to perform channel coding having less coding loss and higher transmission efficiency than the first channel coding.

(2) In the second transmitting circuit according to the above-mentioned first transmitting circuit, in the period for not transmitting the data character, the transmission control unit puts the serial driver into a power-saving state, and when restoring the serial driver from the power-saving state so as to cause the serial driver to transmit the data character, the transmission control unit controls, prior to transmission of the data character, the serial driver to continue transmitting a synchronization symbol determining a synchronization timing defined in the first channel coding for a predetermined time period and to transmit an encoded symbol indicating a start position of the data character, in a state where the first encoding circuit is selected, and then switches from the first encoding circuit to the second encoding circuit.

With this structure, even when the transmitting circuit is put into the power-saving state in the idle period, early establishment of symbol synchronization with the receiver is achieved by transmitting the control character by performing the first channel coding, and packet transmission is achieved with high efficiency by switching the encoding circuit to the second encoding circuit.

(3) In the third transmitting circuit according to the above-mentioned first transmitting circuit, the second encoding circuit generates the encoded block by scrambling the data character of consecutive m bits into an m-bit encoded block according to a predetermined scrambling polynomial.

With this structure, the transmitting circuit can switch between the first encoding circuit and the second encoding circuit while performing control so that a speed at which the encoded symbol is transmitted matches a speed at which the encoded block is transmitted.

(4) In the fourth transmitting circuit according to the above-mentioned third transmitting circuit, the serial driver converts encoded symbols in units of coding frames, the number of bits constituting each coding frame being equal to the least common multiple of the number of bits constituting each of the encoded symbols and the number of bits constituting the encoded block.

With this structure, it is possible to perform communications while readily absorbing the difference in timing resulting from the difference in size of transmission data between the first channel coding and the second channel coding.

(5) In the fifth transmitting circuit according to the above-mentioned fourth transmitting circuit, the transmission control unit switches from the first encoding circuit to the second encoding circuit upon transmission of a coding frame including an encoded symbol indicating a start position of the data character.

With this structure, the transmitting circuit can appropriately switch from the first encoding circuit to the second encoding circuit.

(6) In the sixth transmitting circuit according to the above-mentioned first transmitting circuit, the second encoding circuit generates the encoded block by scrambling the data character of consecutive n bits into an n-bit encoded block according to a predetermined scrambling polynomial.

With this structure, in a case where the bit length of the data character is the same as the bit length of the encoded symbol, the transmitting circuit does not require the standby time and the like to control the speed at which serial data is processed and the speed at which parallel data is processed. The transmitting circuit can therefore easily switch between the first encoding circuit and the second encoding circuit.

(7) In the seventh transmitting circuit according to the above-mentioned first transmitting circuit, the second encoding circuit generates encoded blocks by scrambling n bits, at a time, of consecutively-input m-bit data characters into an n-bit encoded block according to a predetermined scrambling polynomial.

With this structure, in a case where the bit length of the data character is the same as the bit length of the encoded symbol, the transmitting circuit does not require the standby time and the like to control the speed at which serial data is processed and the speed at which parallel data is processed. The transmitting circuit can therefore easily switch between the first encoding circuit and the second encoding circuit.

(8) In the eighth transmitting circuit according to the above-mentioned sixth or seventh transmitting circuit, the transmission control unit switches from the first encoding circuit to the second encoding circuit upon transmission of an encoded symbol indicating a start position of the data character.

With this structure, the transmitting circuit can switch from the first encoding circuit to the second encoding circuit according to an appropriate timing.

(9) In the ninth transmitting circuit according to the above-mentioned eighth transmitting circuit, the transmission control unit switches from the second encoding circuit to the first encoding circuit upon transmission of an encoded block terminating a predetermined number of data characters.

With this structure, upon transmission of the encoded block, the transmitting circuit can easily switch between the first encoding circuit and the second encoding circuit without the need for extra data.

(10) In the tenth transmitting circuit according to the above-mentioned first transmitting circuit, the second encoding circuit generates the encoded block by scrambling a predetermined number of consecutive data characters and adding an s-bit synchronization header to the predetermined number of consecutive data characters.

With this structure, in a case where the synchronization header is added by the second encoding circuit, the transmitting circuit can switch from the first encoding circuit to the second encoding circuit while performing control so that the speed at which the encoded symbol is transmitted matches the speed at which the encoded block is transmitted.

(11) In the eleventh transmitting circuit according to the above-mentioned tenth transmitting circuit, the synchronization header is two-bit or longer additional information including a bit transition from 0 to 1 or from 1 to 0 at least one time, the synchronization header includes a non-terminating synchronization header added to an encoded block not terminating the predetermined number of consecutive data characters, and a terminating synchronization header added to an encoded block terminating the predetermined number of consecutive data characters, and the transmission control unit switches from the first encoding circuit to the second encoding circuit upon transmission of the encoded block to which the terminating synchronization header has been added.

With this structure, the transmitting circuit can clearly notify the receiving circuit as a communication partner of the end of the encoded block generated based on the data character, i.e. the packet payload.

(12) In the twelfth transmitting circuit according to the above-mentioned first transmitting circuit, the transmission control unit performs control so that a sequence of encoded symbols output from the first encoding circuit is input into the second encoding circuit in the period for not transmitting the data character, and the second encoding circuit initializes a scrambler by using the sequence of the encoded symbols.

With this structure, the transmitting circuit can initialize the scrambler with use of data determined in advance to be used, without the need for extra data.

(13) The first receiving circuit according to the present invention is a receiving circuit that receives channel-coded serial data from a transmitting circuit via a serial channel, the channel-coded serial data being obtained by either first channel coding in which an m-bit control character is mapped to an n-bit (m<n) encoded symbol or second channel coding in which a bit pattern of a data character is randomized by scrambling to generate an encoded block, the second channel coding taking more time in establishing synchronization and having less coding loss than the first channel coding, the receiving circuit comprising: a first decoding circuit configured to decode the encoded symbol into the control character; a second decoding circuit configured to decode the encoded block into the data character by descrambling; a reception control unit configured to select one of the first decoding circuit and the second decoding circuit to be used for reception; and a serial receiver configured to convert the channel-coded serial data received via the serial channel into parallel data, and output the parallel data to one of the first decoding circuit and the second decoding circuit selected by the reception control unit, wherein the reception control unit selects the first decoding circuit in a period for not receiving the encoded block, and selects the second decoding circuit in a period for receiving the encoded block.

With this structure, in the idle period not influencing the transmission efficiency, the receiving circuit can select the first decoding circuit configured to perform channel coding having large coding loss but achieving early establishment of synchronization. In the period for transmitting the encoded block generated based on the data character, i.e. the packet payload, the receiving circuit can select the second decoding circuit configured to perform channel coding having less coding loss and higher transmission efficiency than the first channel coding.

(14) In the second receiving circuit according to the above-mentioned first receiving circuit, the reception control unit selects the first decoding circuit at initialization and restoration from a power-saving state, and the reception control unit switches from the second decoding circuit to the first decoding circuit upon reception of an encoded symbol indicating an end position of a packet or upon reception of a predetermined number of encoded blocks.

With this structure, the receiving circuit can appropriately select one of the first decoding circuit and the second decoding circuit, and receive the data character transmitted after performing channel coding having little coding loss.

(15) In the third receiving circuit according to the above-mentioned first receiving circuit, the reception control unit switches from the first decoding circuit to the second decoding circuit upon reception of an encoded symbol indicating a start position of a packet.

With this structure, the receiving circuit can appropriately switch from the first decoding circuit to the second decoding circuit, and receive the data character.

(16) In the fourth receiving circuit according to the above-mentioned first receiving circuit, while selecting the first decoding circuit, the reception control unit puts the serial receiver into a power-saving state upon reception of a signal requesting transition to the power-saving state via the serial channel, and when the serial receiver is restored from the power-saving state upon reception of a signal requesting restoration from the power-saving state from the transmitting circuit via the serial channel, and synchronization is established upon reception of a synchronization symbol requesting establishment of synchronization a plurality of times, the reception control unit switches, upon reception of an encoded symbol indicating a start position of a packet, from the first decoding circuit to the second decoding circuit according to a timing indicated by the start position.

Even when the receiving circuit is put into the power-saving state in the idle period, early establishment of symbol synchronization is achieved by receiving the control character by performing the first channel coding, and packet reception is achieved with high efficiency by switching the decoding circuit to the second decoding circuit.

(17) In the fifth receiving circuit according to the above-mentioned first receiving circuit, the second decoding circuit descrambles an m-bit encoded block input from the serial receiver into an m-bit data character according to a predetermined scrambling polynomial.

With this structure, the receiving circuit can switch from the first decoding circuit to the second decoding circuit while performing control so that the speed at which the encoded symbol is transmitted matches the speed at which the encoded block is transmitted.

(18) In the sixth receiving circuit according to the above-mentioned first receiving circuit, the second decoding circuit descrambles an n-bit encoded block input from the serial receiver into an n-bit data character according to a predetermined scrambling polynomial.

With this structure, in a case where the bit length of the data character is the same as the bit length of the encoded symbol, the receiving circuit does not require the standby time and the like to control the speed at which serial data is processed and the speed at which parallel data is processed. The receiving circuit can therefore easily switch between the first decoding circuit and the second decoding circuit.

(19) In the seventh receiving circuit according to the above-mentioned first receiving circuit, the second decoding circuit decodes n-bit encoded blocks consecutively input from the serial receiver into a sequence of m-bit data characters by descrambling according to a predetermined scrambling polynomial.

With this structure, in a case where the bit length of the encoded symbol is the same as the bit length of the encoded block, the receiving circuit can easily switch between the first decoding circuit and the second decoding circuit without the need for extra data.

(20) In the eighth receiving circuit according to the above-mentioned first receiving circuit, the encoded block has been generated by scrambling a predetermined number of consecutive data characters and adding an s-bit synchronization header to the predetermined number of consecutive data characters, and the second decoding circuit removes the synchronization header from each of encoded blocks consecutively input from the serial receiver, and decodes each of the encoded blocks from which the synchronization header has been removed into the predetermined number of consecutive data characters by descrambling according to a predetermined scrambling polynomial.

With this structure, in a case where the second decoding circuit decodes the encoded block to which the synchronization header has been added, the receiving circuit can switch from the first decoding circuit to the second decoding circuit while performing control so that the speed at which the encoded symbol is transmitted matches the speed at which the encoded block is transmitted.

(21) In the ninth receiving circuit according to the above-mentioned eighth receiving circuit, the synchronization header is two-bit or longer information including a bit transition from 0 to 1 or from 1 to 0 at least one time, the synchronization header includes a non-terminating synchronization header used for an encoded block not terminating the predetermined number of data characters, and a terminating synchronization header used for an encoded block terminating the predetermined number of data characters, and the reception control unit switches from the second decoding circuit to the first decoding circuit upon reception of an encoded block including the terminating synchronization header.

With this structure, the receiving circuit can clearly detect the end of the encoded block generated based on the data character, i.e. the packet payload.

(22) In the tenth receiving circuit according to the above-mentioned first receiving circuit, the serial receiver converts the serial data into encoded symbols in units of coding frames, the number of bits constituting each coding frame being equal to the least common multiple of the number of bits constituting each of the encoded symbols and the number of bits constituting the encoded block.

With this structure, the receiving circuit can perform conversion into the encoded symbol without caring the difference in timing resulting from the difference in size of transmission data between the first channel coding and the second channel coding.

(23) In the eleventh receiving circuit according to the above-mentioned first receiving circuit, the reception control unit performs control so that a sequence of encoded symbols input into the first decoding circuit is also input into the second decoding circuit in the period for not receiving the encoded block, and the second decoding circuit initializes a descrambler by using the sequence of the encoded symbols.

With this structure, the receiving circuit can initialize the descrambler with use of data determined in advance to be used, without the need for extra data.

(24) The first communication system according to the present invention is a communication system that transmits channel-coded serial data from a transmitting circuit to a receiving circuit via a serial channel, wherein the transmitting circuit includes: a first encoding circuit configured to perform first channel coding in which an m-bit control character is mapped to an n-bit (m<n) encoded symbol; a second encoding circuit configured to perform second channel coding in which a bit pattern of a data character is randomized by scrambling to generate an encoded block, the second channel coding taking more time in establishing synchronization with the receiving circuit and having less coding loss than the first channel coding; a transmission control unit configured to select one of the first encoding circuit and the second encoding circuit to be used for transmission; and a serial driver configured to, when the transmission control unit selects the first encoding circuit, convert the encoded symbol generated by the first encoding circuit into serial data and transmit the serial data via the serial channel, and to, when the transmission control unit selects the second encoding circuit, convert the encoded block generated by the second encoding circuit into serial data and transmit the serial data via the serial channel, the transmission control unit selects the first encoding circuit in a period for not transmitting the data character, and selects the second encoding circuit in a period for transmitting the data character, the receiving circuit includes: a first decoding circuit configured to decode the encoded symbol into the control character; a second decoding circuit configured to decode the encoded block into the data character by descrambling; a reception control unit configured to select one of the first decoding circuit and the second decoding circuit to be used for reception; and a serial receiver configured to convert the channel-coded serial data received via the serial channel into parallel data, and output the parallel data to one of the first decoding circuit and the second decoding circuit selected by the reception control unit, and the reception control unit selects the first decoding circuit in a period for not receiving the encoded block, and selects the second decoding circuit in a period for receiving the encoded block.

The first communication method for use in the first communication system according to the present invention is a communication method for use in a communication system that transmits channel-coded serial data from a transmitting circuit to a receiving circuit via a serial channel, wherein channel coding includes: first channel coding in which an m-bit control character is mapped to an n-bit (m<n) encoded symbol; and second channel coding in which a bit pattern of a data character is randomized by scrambling to generate an encoded block, the second channel coding takes more time in establishing synchronization between the transmitting circuit and the receiving circuit, and has less coding loss than the first channel coding, and the communication method for use in the communication system transmits the channel-coded serial data while switching between the first channel coding and the second channel coding, and uses the first channel coding in a period for not transmitting the encoded block, and uses the second channel coding in a period for transmitting the encoded block.

With this structure, in the idle period not influencing the transmission efficiency, the communication system can select the first encoding circuit configured to perform channel coding having large coding loss but achieving early establishment of synchronization. In the period for transmitting the encoded block generated based on the data character, i.e. the packet payload, the communication system can select the second encoding circuit configured to perform channel coding having less coding loss and higher transmission efficiency than the first channel coding.

INDUSTRIAL APPLICABILITY

The transmitting circuit, the receiving circuit, and the communication system including both of the circuits according to the present invention are each usable, as a circuit system that achieves early establishment of symbol synchronization while suppressing reduction of coding efficiency, in devices between which data transmission is performed.

REFERENCE SIGNS LIST 100 host device
101 data processing unit
102 interface circuit
103 transmitting circuit
104 PLL
105 receiving circuit
106 D0+ terminal
107 D0− terminal
108 D1+ terminal
109 D1− terminal
110 target device
111 back-end unit
112 interface circuit
113 receiving circuit
114 PLL
115 transmitting circuit
116 D0+ terminal
117 D0− terminal
118 D1+ terminal
119 D1− terminal
121, 122 serial channel
201 first encoding circuit
202 second encoding circuit
203 transmission control unit
204 serial driver
205 serializer (SER)
206 differential driver
301 serial driver
302 first decoding circuit
303 second decoding circuit
304 reception control unit
305 differential receiver
306 de-serializer
307 detection circuit

The invention claimed is:

1. A transmitting circuit that performs channel coding and transmits channel-coded serial data to a receiving circuit via a serial channel, the transmitting circuit comprising:
a first encoding circuit configured to perform first channel coding in which an m-bit control character is mapped to an n-bit (m<n) encoded symbol, wherein m and n are integer numbers;
a second encoding circuit configured to perform second channel coding in which a bit pattern of a data character is randomized by scrambling to generate an encoded block, the second channel coding taking more time in establishing synchronization with the receiving circuit and having less coding loss than the first channel coding;
a transmission control unit configured to select one of the first encoding circuit and the second encoding circuit to be used for transmission; and
a serial driver configured to, when the transmission control unit selects the first encoding circuit, convert the encoded symbol generated by the first encoding circuit into serial data and transmit the serial data via the serial channel, and to, when the transmission control unit selects the second encoding circuit, convert the encoded block generated by the second encoding circuit into serial data and transmit the serial data via the serial channel, wherein
the transmission control unit selects the first encoding circuit in a period for not transmitting the data character, and selects the second encoding circuit in a period for transmitting the data character.

2. The transmitting circuit of claim 1, wherein
in the period for not transmitting the data character, the transmission control unit puts the serial driver into a power-saving state, and
when restoring the serial driver from the power-saving state so as to cause the serial driver to transmit the data character, the transmission control unit
controls, prior to transmission of the data character, the serial driver to continue transmitting a synchronization symbol determining a synchronization timing defined in the first channel coding for a predetermined time period and to transmit an encoded symbol indicating a start position of the data character, in a state where the first encoding circuit is selected, and then switches from the first encoding circuit to the second encoding circuit.

3. The transmitting circuit of claim 1, wherein
the second encoding circuit generates the encoded block by scrambling the data character of consecutive m bits into an m-bit encoded block according to a predetermined scrambling polynomial.

4. The transmitting circuit of claim 3, wherein
the serial driver converts encoded symbols in units of coding frames, the number of bits constituting each coding frame being equal to the least common multiple of the number of bits constituting each of the encoded symbols and the number of bits constituting the encoded block.

5. The transmitting circuit of claim 4, wherein
the transmission control unit switches from the first encoding circuit to the second encoding circuit upon transmission of a coding frame including an encoded symbol indicating a start position of the data character.

6. The transmitting circuit of claim 1, wherein
the second encoding circuit generates the encoded block by scrambling the data character of consecutive n bits into an n-bit encoded block according to a predetermined scrambling polynomial.

7. The transmitting circuit of claim 6, wherein
the transmission control unit switches from the first encoding circuit to the second encoding circuit upon transmission of an encoded symbol indicating a start position of the data character.

8. The transmitting circuit of claim 7, wherein
the transmission control unit switches from the second encoding circuit to the first encoding circuit upon transmission of an encoded block terminating a predetermined number of data characters.

9. The transmitting circuit of claim 1, wherein
the second encoding circuit generates encoded blocks by scrambling n bits, at a time, of consecutively-input m-bit data characters into an n-bit encoded block according to a predetermined scrambling polynomial.

10. The transmitting circuit of claim 9, wherein
the transmission control unit switches from the first encoding circuit to the second encoding circuit upon transmission of an encoded symbol indicating a start position of the data character.

11. The transmitting circuit of claim 1, wherein
the second encoding circuit generates the encoded block by scrambling a predetermined number of consecutive data characters and adding an s-bit synchronization header to the predetermined number of consecutive data characters, wherein s is an integer number.

12. The transmitting circuit of claim 11, wherein
the synchronization header is two-bit or longer additional information including a bit transition from 0 to 1 or from 1 to 0 at least one time,
the synchronization header includes a non-terminating synchronization header added to an encoded block not terminating the predetermined number of consecutive data characters, and a terminating synchronization header added to an encoded block terminating the predetermined number of consecutive data characters, and
the transmission control unit switches from the first encoding circuit to the second encoding circuit upon transmission of the encoded block to which the terminating synchronization header has been added.

13. The transmitting circuit of claim 1, wherein
the transmission control unit performs control so that a sequence of encoded symbols output from the first encoding circuit is input into the second encoding circuit in the period for not transmitting the data character, and
the second encoding circuit initializes a scrambler by using the sequence of the encoded symbols.

14. A receiving circuit that receives channel-coded serial data from a transmitting circuit via a serial channel, the channel-coded serial data being obtained by either first channel coding in which an m-bit control character is mapped to an n-bit (m<n) encoded symbol or second channel coding in which a bit pattern of a data character is randomized by scrambling to generate an encoded block, the second channel coding taking more time in establishing synchronization and having less coding loss than the first channel coding, wherein m and n are integer numbers, the receiving circuit comprising:
a first decoding circuit configured to decode the encoded symbol into the control character;
a second decoding circuit configured to decode the encoded block into the data character by descrambling;
a reception control unit configured to select one of the first decoding circuit and the second decoding circuit to be used for reception; and
a serial receiver configured to convert the channel-coded serial data received via the serial channel into parallel data, and output the parallel data to one of the first decoding circuit and the second decoding circuit selected by the reception control unit, wherein
the reception control unit selects the first decoding circuit in a period for not receiving the encoded block, and selects the second decoding circuit in a period for receiving the encoded block.

15. A transmission method for use in a transmitting circuit that performs channel coding and transmits channel-coded serial data to a receiving circuit via a serial channel, the transmission method comprising:
a first encoding step of performing first channel coding in which an m-bit control character is mapped to an n-bit (m<n) encoded symbol, wherein m and n are integer numbers;
a second encoding step of performing second channel coding in which a bit pattern of a data character is randomized by scrambling to generate an encoded block, the second channel coding taking more time in establishing synchronization with the receiving circuit and having less coding loss than the first channel coding;
a transmission control step of controlling transmission by selecting one of the first channel coding and the second channel coding to be used for transmission; and
a transmission step of converting, when the transmission control step selects the first channel coding, the encoded symbol generated by the first encoding step into serial data and transmitting the serial data via the serial channel, and converting, when the transmission control step selects the second channel coding, the encoded block generated by the second encoding step into serial data and transmitting the serial data via the serial channel, wherein
the transmission control step selects the first channel coding in a period for not transmitting the data character, and selects the second channel coding in a period for transmitting the data character.

* * * * *